United States Patent
Iwasa et al.

(10) Patent No.: US 11,209,518 B2
(45) Date of Patent: Dec. 28, 2021

(54) RADAR DEVICE

(71) Applicant: Panasonic Intellectual Property Management Co., Ltd., Osaka (JP)

(72) Inventors: Kenta Iwasa, Kanagawa (JP); Hidekuni Yomo, Kanagawa (JP); Ryosuke Shiozaki, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 346 days.

(21) Appl. No.: 16/299,725

(22) Filed: Mar. 12, 2019

(65) Prior Publication Data

US 2019/0293753 A1   Sep. 26, 2019

(30) Foreign Application Priority Data

Mar. 23, 2018   (JP) .............................. JP2018-056445

(51) Int. Cl.
  *G01S 7/03* (2006.01)
  *G01S 7/28* (2006.01)
  (Continued)

(52) U.S. Cl.
  CPC ............... *G01S 7/032* (2013.01); *G01S 7/03* (2013.01); *G01S 7/2813* (2013.01);
  (Continued)

(58) Field of Classification Search
  None
  See application file for complete search history.

(56) References Cited

U.S. PATENT DOCUMENTS

2012/0050091 A1   3/2012   Inami et al.
2017/0082730 A1   3/2017   Kishigami et al.
(Continued)

FOREIGN PATENT DOCUMENTS

EP   2963442 A1   1/2016
EP   3471210 A1   4/2019
(Continued)

OTHER PUBLICATIONS

The Extended European Search Report dated Aug. 7, 2019 for the related European Patent Application No. 19162065.7.
(Continued)

*Primary Examiner* — Whitney Moore
(74) *Attorney, Agent, or Firm* — Seed IP Law Group LLP

(57) ABSTRACT

A radar device includes a radar transmitting circuit that transmits radar signals from a transmission array antenna, and a radar receiving circuit that receives returning wave signals, where the radar signals have been reflected at a target, from a receiving array antenna. One of the transmitting array antenna and the receiving array antenna includes multiple first antennas of which phase centers are laid out along a first axis direction. The other of the transmitting array antenna and the receiving array antenna includes multiple second antennas of which phase centers are laid out at a second spacing along a second axis direction that is different from the first axis direction. The multiple first antennas include multiple antennas of which the phase centers are laid out at a first spacing, and multiple antennas of which the phase centers are laid out at a third spacing that is different from the first spacing.

9 Claims, 29 Drawing Sheets

(51) Int. Cl.
  *H01Q 3/34* (2006.01)
  *G01S 13/87* (2006.01)
  *G01S 13/931* (2020.01)

(52) U.S. Cl.
  CPC ............ *G01S 13/878* (2013.01); *H01Q 3/34* (2013.01); *G01S 13/931* (2013.01)

(56) References Cited

U.S. PATENT DOCUMENTS

2017/0139042 A1* 5/2017 Alenljung ............ G01S 7/2921
2017/0307744 A1 10/2017 Loesch et al.

FOREIGN PATENT DOCUMENTS

| JP | 2014-64114 A | 4/2014 |
|---|---|---|
| JP | 2017-58359 A | 3/2017 |
| JP | 2017-521683 A | 8/2017 |
| JP | 2017-534881 A | 11/2017 |
| WO | 2010/122860 A1 | 10/2010 |

OTHER PUBLICATIONS

Kishigami Takaaki et al: "Millimeter-wave MIMO Radar System Using L-shaped Tx and Rx Arrays", 2016 European Radar Conference (EURAD), EUMA, Oct. 5, 2016 (Oct. 5, 2016), pp. 29-32, XP033041425.

P. P. Vaidyanathan et al., "MIMO Radar with Broadband waveforms: Smearing Filter Banks and 2D Virtual Arrays", IEEE Asilomar Conference on Signals, Systems and Computers, Oct. 26, 2008, pp. 188-192.

James A. Cadzow, "Direction-of-Arrival Estimation Using Signal Subspace Modeling", IEEE Transactions on Aerospace and Electronic Systems, vol. 28, No. 1, Jan. 1992, pp. 64-79.

Japanese Notice of Reasons for Refusal dated Jun. 15, 2021, for the corresponding Japanese Patent Application No. 2018-056445, 9 pages. (With English Translation).

* cited by examiner

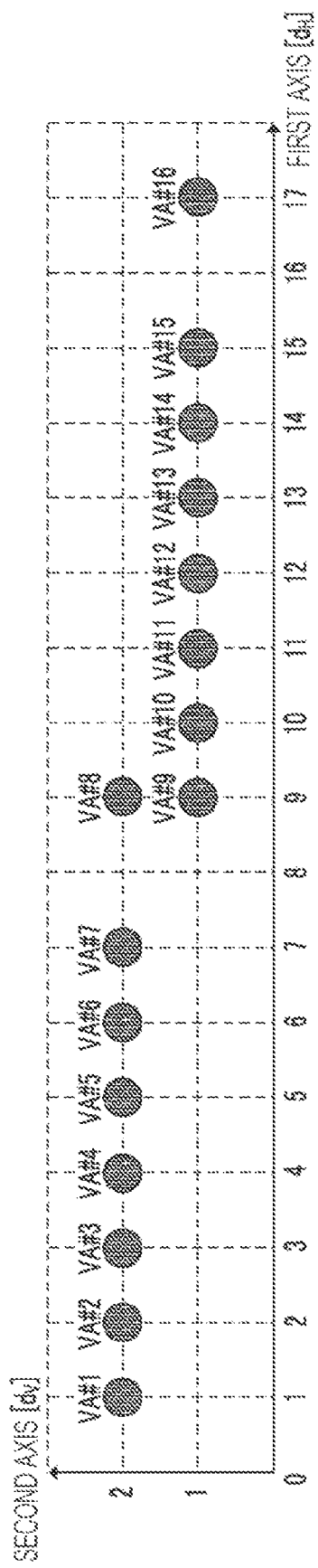

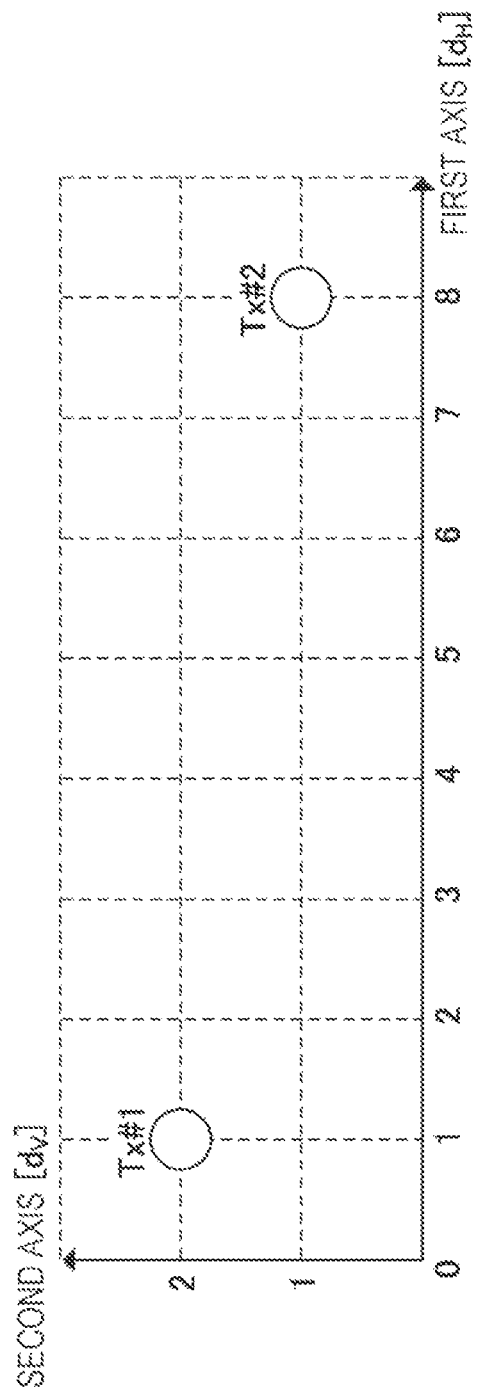

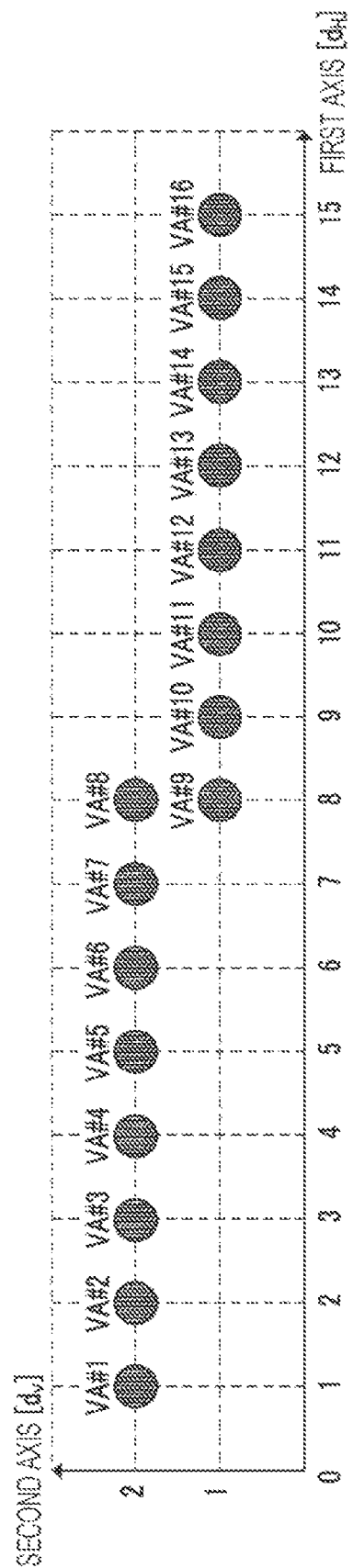

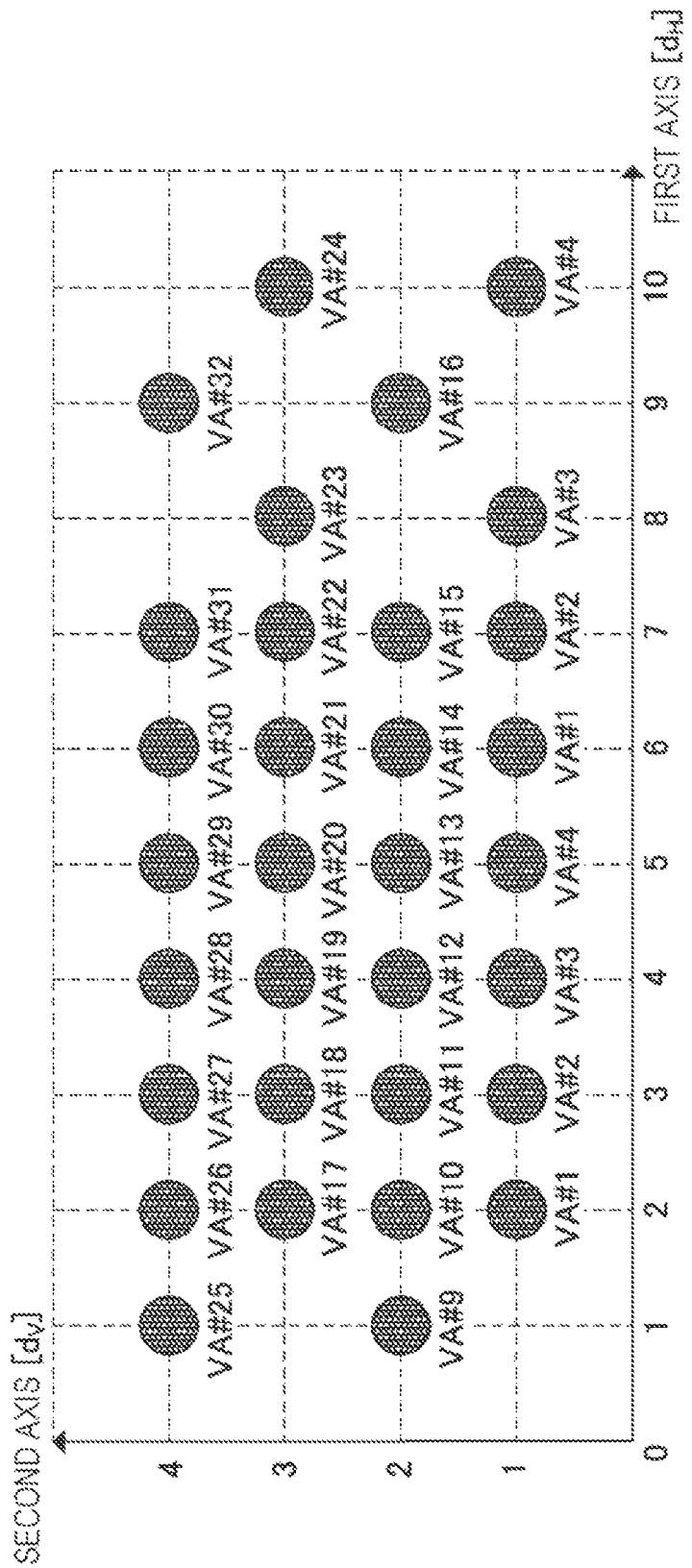

RADAR DEVICE

BACKGROUND

1. Technical Field

The present disclosure relates to a radar device.

2. Description of the Related Art

In recent years, radar devices are being studied that use short wavelength radar transmission signals, including microwaves or millimeter waves that yield high resolution. There also is demand for development of radar devices that detect, in addition to vehicles, objects (targets) including pedestrians, over a wide angle range (wide-angle radar devices), in order to improve safety outdoors.

There also has been proposed a radar device having a configuration that has multiple antennas (antenna array) at a transmitting branch in addition to a receiving branch, and that performs beam scanning by signal processing using transmitting/receiving array antennas (also referred to as Multiple Input and Multiple Output (MIMO) radar) (e.g., see P. P. Vaidyanathan, P. Pal, Chun-Yang Chen, "MIMO radar with broadband waveforms: Smearing filter banks and 2D virtual arrays, "IEEE Asilomar Conference on Signals, Systems and Computers, pp. 188-192, 2008 (hereinafter "VAIDYANATHAN et al").

A MIMO radar enables configuration of virtual receiving array antennas (hereinafter referred to as virtual receiving array) equivalent to the product of the transmitting antenna element count and receiving antenna element count as a maximum, by innovative layout of antenna elements in a transmitting/receiving array antenna. This is advantageous in that the effective aperture length of the array antenna can be increased with a small number of elements.

Also, MIMO radar can be applied in cases of performing three-dimensional measurement by beam scanning in the two dimensions of the vertical direction and horizontal direction, besides one-dimensional scanning in the vertical direction or the horizontal direction (e.g., see Japanese Unexamined Patent Application Publication (Translation of PCT Application) No. 2017-534881 and VAIDYANATHAN et al).

SUMMARY

One non-limiting and exemplary embodiment provides a radar device capable of three-dimensional measurement, while suppressing sidelobes and securing high resolution in the horizontal direction.

In one general aspect, the techniques disclosed here feature a radar device including a radar transmitting circuit that transmits radar signals from a transmission array antenna, and a radar receiving circuit that receives returning wave signals, where the radar signals have been reflected at a target, from a receiving array antenna. One of the transmitting array antenna and the receiving array antenna includes a plurality of first antennas of which phase centers are laid out along a first axis direction. The other of the transmitting array antenna and the receiving array antenna includes a plurality of second antennas of which phase centers are laid out at a second spacing along a second axis direction that is different from the first axis direction. The plurality of first antennas include a plurality of antennas of which the phase centers are laid out at a first spacing, and a plurality of antennas of which the phase centers are laid out at a third spacing that is different from the first spacing.

According to an aspect of the present disclosure, a radar device capable of three-dimensional measurement, while suppressing sidelobes and securing high resolution in the horizontal direction, can be provided.

It should be noted that general or specific embodiments may be implemented as a system, a device, a method, an integrated circuit, a computer program, or a recording medium, or may be realized by any combination of system, device, method, integrated circuit, computer program, and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10C is a diagram illustrating the layout of a virtual receiving array according to the first layout example;

FIG. 11B is a diagram illustrating the layout of transmitting antennas in a transmitting array antenna according to the first comparative example;

FIG. 11C is a diagram illustrating the layout of a virtual receiving array according to the first comparative example;

FIG. 16B is a diagram illustrating the layout of a virtual receiving array according to the third layout example;

DETAILED DESCRIPTION

Figure 1:
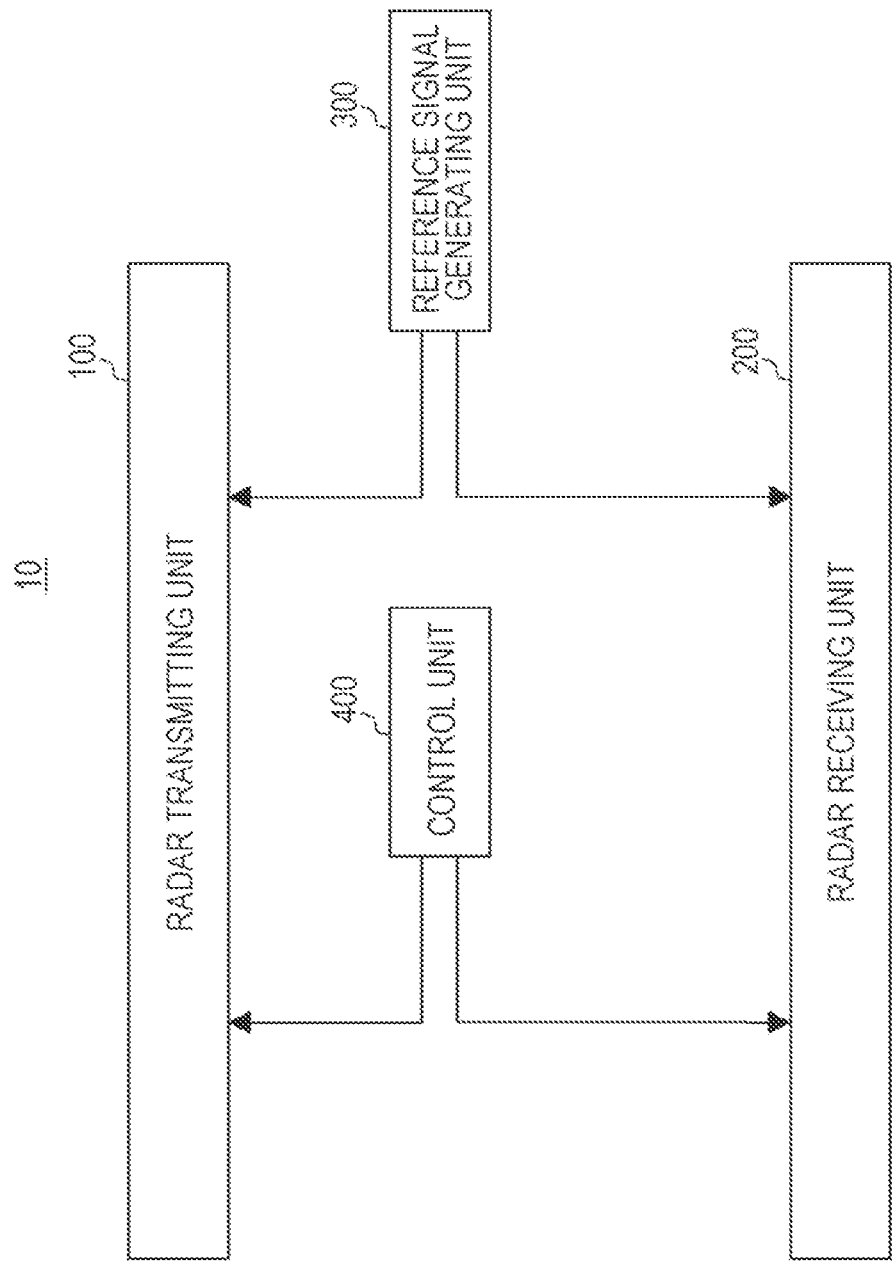
FIG. 1 is a bock diagram illustrating an example of the configuration of a radar device according to a first embodiment.

A type of radar device called a pulse radar device, which repeatedly emits pulse waves for example, is known. Reception signals of a wide-angle pulse radar that detects vehicles and pedestrians over a wide range are signals where multiple reflected waves from nearby targets (e.g., vehicles) and distant targets (e.g., pedestrians) are intermingled. Accordingly, (1) a configuration where the radar transmitting unit transmits pulse waves or pulse modulation waves having autocorrelation properties of low-range sidelobes (hereinafter referred to as low-range sidelobe properties) is being studied, and (2) a configuration where the radar transmitting unit has a broad reception dynamic range is being studied.

Wide-angle radar device configurations include the following two. A first configuration transmits radar waves by mechanically or electronically scanning pulse waves or modulation waves using a narrow-angle (beam width of around several degrees) directional beam, and receives reflected waves using a narrow-angle directional beam. Tracking capabilities of fast-moving targets deteriorates with this configuration, since the number of times of scanning to obtain high resolution increases.

A second configuration receives reflected waves by an array antenna made up of multiple antennas (multiple antenna elements) at the receiving branch, and uses a technique of estimating the arrival angle of reflected waves (direction of arrival (DOA) estimation) by a signal processing algorithm based on reception phase difference as to antenna element spacing. This configuration enables reduction of the scanning time since the arrival angle can be estimated at the receiving branch even if scanning spacings of transmission beams at the transmitting branch are thinned out, and accordingly tracking capabilities are higher as compared to the first configuration. Examples of DOA estimation techniques include Fourier transform based on matrix operations, Capon and linear prediction (LP) based on inverse matrix operations, and MUltiple SIgnal Classification (MUSIC) and estimation of signal parameters via rotational invariance techniques (ESPRIT) based on eigenvalue operations.

A MIMO radar that performs beam scanning using multiple antenna elements at the transmitting branch in addition to the receiving branch transmits signals multiplexed using time division, frequency division, or code division, from multiple transmitting antenna elements. Signals reflected at surrounding objects are received by multiple receiving antenna elements, and the multiplexed transmission signals are separated from each of the received signals, and thus received.

Further, a MIMO radar enables configuration of virtual receiving array antennas (virtual receiving array) equivalent to the product of the transmitting antenna element count and receiving antenna element count as a maximum, by innovative layout of antenna elements in a transmitting/receiving array antenna. Accordingly, propagation channel response indicated by the product of the transmitting antenna element count and receiving antenna element count can be obtained. Also, the effective aperture length of the array antenna can be virtually broadened with a small number of elements, and angular resolution can be improved by appropriately laying out spacings between transmitting/receiving antenna elements.

Antenna element configurations in a MIMO radar are generally classified into configurations using a single antenna element (hereinafter referred to as single antenna) and configurations using a sub-array arrangement of multiple antenna elements (hereinafter referred to as sub-array). In a case of using a single antenna, properties are exhibited with broad directionality as compared to a case of using a sub-array, but antenna gain is relatively lower. Accordingly, in order to improve the reception signal to noise ratio (SNR) of the returning wave signals, either more addition processing has to be performed in the reception signal processing, or the antenna has to be configured using multiple single antennas, for example.

On the other hand, in a case of using a sub-array, multiple antenna elements are included in one sub-array, unlike the case of using a single antenna, so the physical size of the antenna increases and antenna gain in the main beam direction can be increased. Specifically, the physical size of the sub-array is around or greater than the wavelength of the radio frequency (carrier frequency) of the transmission signals.

Also, MIMO radar can be applied in cases of performing two-dimensional beam scanning in the vertical direction and horizontal direction, besides one-dimensional scanning in the vertical direction or the horizontal direction (e.g., see Japanese Unexamined Patent Application Publication (Translation of POT Application) No. 2017-534881 and VAIDYANATHAN et al). For example, there is demand for a MIMO radar capable of long-distance two-dimensional beam scanning that is used for onboard purposes and so forth to have angular estimation capabilities in the vertical direction, in addition to high resolution in the horizontal direction on the same level as a MIMO radar that performs one-dimensional beam scanning in the horizontal direction.

However, there are cases where the number of antenna elements of the transmitting and receiving branches is restricted, to reduce the size and cost of the MIMO radar. For example, in a case where there is a restriction of around four transmitting antenna elements and around four receiving antenna elements, the aperture length in the vertical direction and horizontal direction is restricted in the planar virtual receiving array of the MIMO radar. Restricting the aperture length results in lower resolution in the vertical direction and horizontal direction.

For example, there is demand for a MIMO radar capable of long-distance two-dimensional beam scanning used for onboard purposes and so forth to have angular estimation capabilities in the vertical direction, in addition to high resolution in the horizontal direction on the same level as a MIMO radar that performs one-dimensional beam scanning in the horizontal direction. However, in cases where the number of antenna elements is restricted, the aperture length is restricted in comparison with a MIMO radar performing one-dimensional scanning. Restricting the aperture length results in lower resolution in the horizontal direction as compared with a MIMO radar performing one-dimensional scanning.

Also, in order to realize MIMO radar with reduced probability of erroneous detection, the virtual receiving array preferably is configured so that there are less sidelobes in the beam being formed.

First Embodiment

According to an aspect of the present disclosure, MIMO radar can be configured with capable of three-dimensional measurement with additional angular estimation capabilities in the vertical direction, while suppressing deterioration of angular separation capabilities in the horizontal direction as compared with a MIMO radar performing one-dimensional beam scanning.

Embodiments of the present disclosure will be described below in detail with reference to the drawings. Note that in the embodiments, components that are the same are denoted by the same symbols, and redundant description thereof will be omitted.

Before describing the layout of multiple transmitting antennas (transmitting sub-arrays) and multiple receiving antennas (receiving sub-arrays), the configuration of the radar device will be described. Specifically, description will be made regarding the configuration of a MIMO radar where multiple transmitting antennas are switched by time division in the transmitting branch of the radar device, different radar transmission signals that have been time division multiplexed are transmitted, and the transmission signals are separated and reception processing is performed at the receiving branch. Note that the configuration of the radar device is not restricted to transmitting different radar transmission signals that have been time division multiplexed. For example, the radar transmission signals may be frequency division multiplexed instead of time division multiplexed or code division multiplexed. That is to say, a configuration may be made where different radar transmission signals that have been frequency division multiplexed are transmitted by multiple transmitting antennas at the transmitting branch, and the transmission signals are separated and reception processing is performed at the receiving branch. Similarly, a configuration of the radar device may be made where radar transmission signals that have been code division multiplexed are transmitted by multiple transmitting antennas at the transmitting branch, and reception processing is performed at the receiving branch. It should be noted that the embodiments described below are only exemplary, and that the present disclosure is not restricted by the following embodiments.

Configuration of Radar Device 10

FIG. 1 is a block diagram illustrating an example of the configuration of a radar device 10 according to the present disclosure. The radar device 10 has a radar transmitting unit (also referred to as a transmitting branch or radar transmission circuit) 100, a radar receiving unit (also referred to as a receiving branch or radar reception circuit) 200, a reference signal generating unit (reference signal generating circuit) 300, and a control unit (control circuit) 400.

The radar transmitting unit 100 generates high-frequency (radio frequency) radar signals (radar transmission signals) based on reference signals received from the reference signal generating unit 300. The radar transmitting unit 100 then transmits the radar transmission signals while switching multiple transmitting antenna elements #1 through #Nt by time division.

The radar receiving unit 200 receives returning wave signals that are radar transmission signals reflected at a target (omitted from illustration), using multiple receiving antenna elements #1 through #Na. The radar receiving unit 200 performs processing synchronously with the radar transmitting unit 100 by performing the processing operations described below, using reference signals received from the reference signal generating unit 300. The radar receiving unit 200 performs signal processing on returning wave signals received at each receiving antenna element #1 through #Na, and performs detection of at least whether or not a target is present, or estimation of the direction thereof. Note that a target is an object that is to be detected by the radar device 10, and includes, for example, vehicles (including those with two wheels, three wheels, and four wheels) and people.

The reference signal generating unit 300 connected to each of the radar transmitting unit 100 and the radar receiving unit 200. The reference signal generating unit 300 supplies reference signals to the radar transmitting unit 100 and radar receiving unit 200, to synchronize the processing at the radar transmitting unit 100 and radar receiving unit 200.

The control unit 400 sets the pulse code generated by the radar transmitting unit 100, the phase to be set in variable beam control at the radar transmitting unit 100 and the level of amplification of signals by the radar transmitting unit 100, for each radar transmission cycle Tr. The control unit 400 outputs control signals instructing pulse code (code control signals), control signals instructing phase (phase control signals), and control signals instructing amplification level of transmission signals (transmission control signals) to the radar transmitting unit 100. The control unit 400 also outputs output switching signals instructing timing of switching of transmitting sub-arrays #1 through #N of the radar transmitting unit 100 (switching of output of radar transmission signals) to the radar receiving unit 200.

Configuration of Radar Transmitting Unit 100

Figure 2:
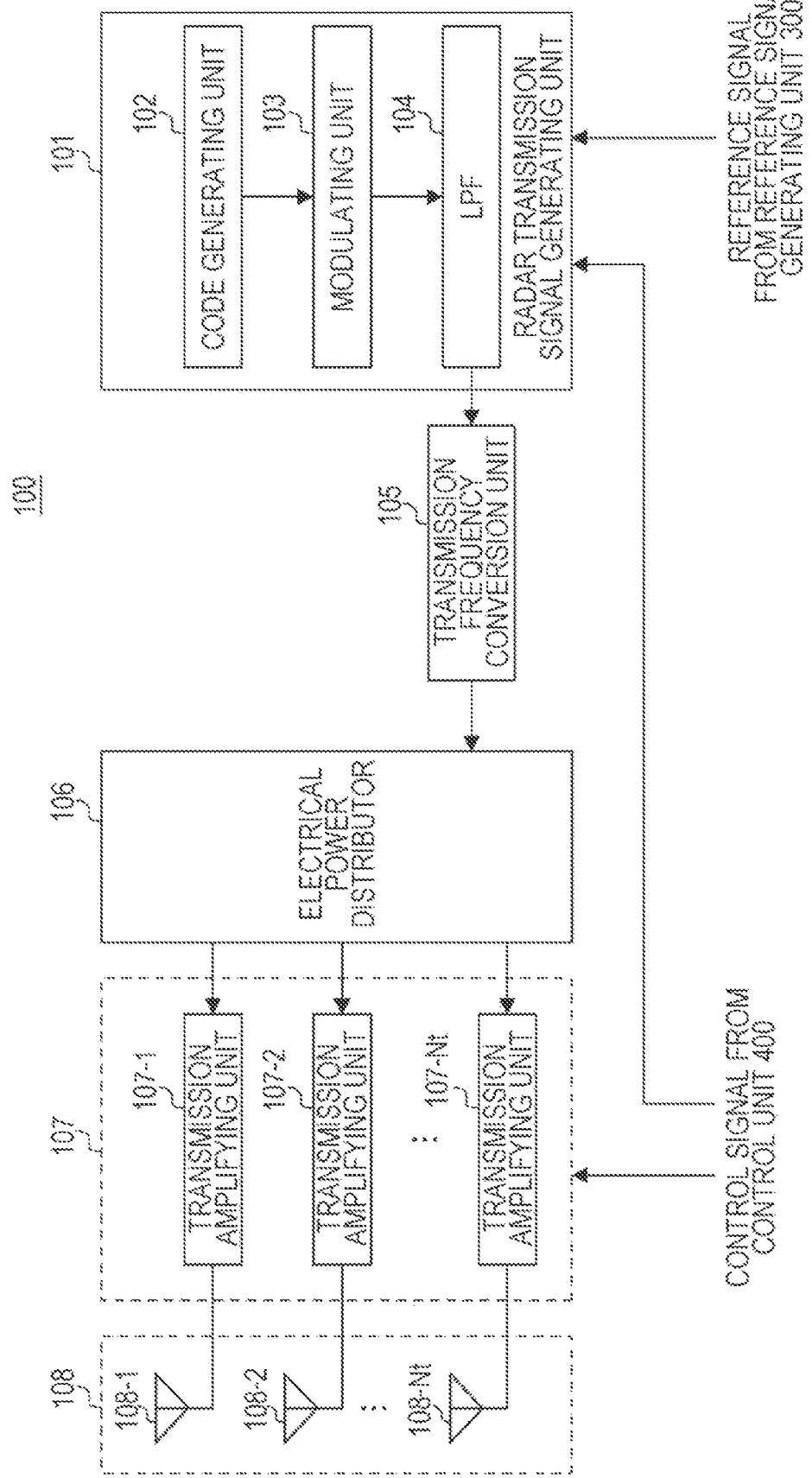
FIG. 2 is a block diagram illustrating an example of the configuration of a radar transmitting unit according to the first embodiment.

FIG. 2 is a block diagram illustrating an example of the configuration of the radar transmitting unit 100 according to the present disclosure. The radar transmitting unit 100 has a radar transmission signal generating unit (radar transmission signal generating circuit) 101, a transmission frequency conversion unit (transmission frequency conversion circuit) 105, an electrical power distributor (electrical power distribution circuit) 106, a transmission amplifying unit (transmission amplifying circuit) 107, and a transmission array antenna 108.

Although the following description will be made illustrating the configuration of the radar transmitting unit 100 using a coded pulse radar, but this is not restrictive. For example, the radar transmitting unit 100 is similarly applicable to radar transmission signals using frequency-modulated continuous-wave (FM-CW) radar frequency modulation.

The radar transmission signal generating unit 101 generates a timing clock (clock signal) where a reference signal received from the reference signal generating unit 300 is multiplied by a predetermined number, and generates radar transmission signals based on the generated timing dock. The radar transmission signal generating unit 101 repeatedly outputs radar transmission signals at the radar transmission cycle Tr, based on code control signals from the control unit 400 at each predetermined radar transmission cycle Tr.

Radar transmission signals are expressed by $$y(k_T, M) = I(k_T, M) + jQ(k_T, M)$$

where j represents an imaginary unit, k represents discrete time, M is an ordinal number of the radar transmission cycle, and $I(k_T, M)$ and $Q(k_T, M)$ respectively represent the in-phase component and quadrature component of radar transmission signal $(k_T, M)$ at discrete time $k_T$ in the M'th radar transmission cycle.

The radar transmission signal generating unit 101 includes a code generating unit (code generating circuit) 102, a modulating unit (modulation circuit) 103, and a low-pass filter (LPF) 104.

The code generating unit 102 generates code $a_n(M)$ (where n=1, . . . , L) of a code sequence having a code length of L (pulse code), in the M'th radar transmission cycle, based on code control signals at each radar transmission cycle Tr. Pulse code that yields low-range sidelobe properties is used for the code $a_n(M)$ generated at the code generating unit 102. Examples of the code sequence include Barker code, maximum-length sequence code, and Gold code. The code $a_n(M)$ generated by the code generating unit 102 may all be of the same code, or may be code including different codes.

The modulating unit 103 subjects the code $a_n(M)$ output from the code generating unit 102 to pulse modulation (amplitude modulation, amplitude-shift keying (ASK), or pulse shift keying) or phase modulation (phase-shift keying (PSK), and outputs the modulated code to the LPF 104.

Of the modulated signals output from the modulating unit 103, signal components of a predetermined restricted bandwidth and lower are output to the transmission frequency conversion unit 105 as baseband radar transmission signals by the LPF 104.

The transmission frequency conversion unit 105 performs frequency conversion of the baseband radar transmission signals output from the LPF 104 into radar transmission signals of a predetermined carrier frequency (radio frequency (RF)) band.

The electrical power distributor 106 distributes the radio-frequency-band radar transmission signals output from the transmission frequency conversion unit 105 over a count lilt, and outputs to the transmission amplifying units 107.

The transmission amplifying units 107 (107-1 through 107-Nt) either amplify the radar transmission signals to be output to a predetermined level and output, or turn transmission output off, based on transmission control signals for each radar transmission cycle Tr instructed from the control unit 400.

The transmission array antenna 108 has alt transmitting antenna elements #1 through #Nt (108-1 through 108-Nt). The transmitting antenna elements #1 through #Nt are respectively connected to individual transmission amplifying units 107-1 through 107-Nt, and transmit radar transmission signals output from the individual transmission amplifying units 107-1 through 107-Nt.

Figure 3:
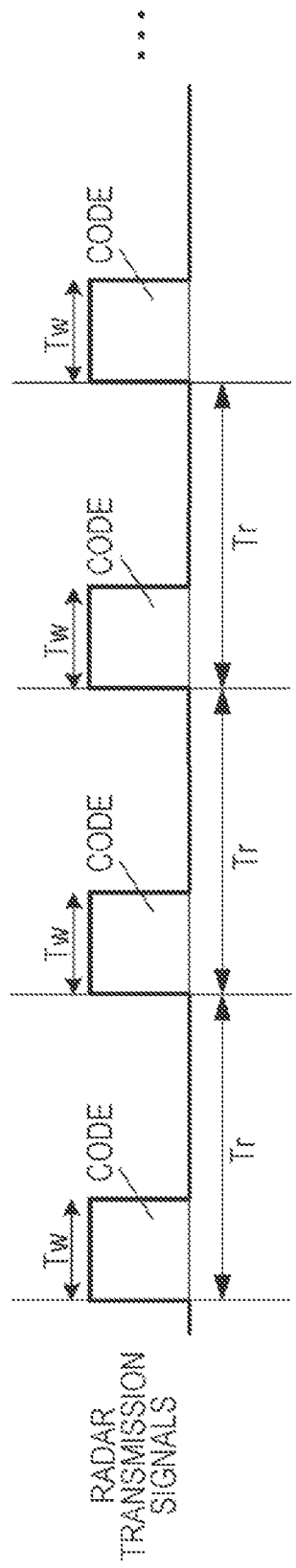
FIG. 3 is a block diagram illustrating an example of radar transmission signals according to the first embodiment.

FIG. 3 is a diagram illustrating an example of radar transmission signals according to the present disclosure. In each radar transmission cycle Tr, the pulse code sequence is transmitted during a code transmission slot Tw, and the remainder (Tr−Tw) is a non-transmission slot. A pulse code sequence of code length L is included in the code transmission slot Tw. An L count of sub-pulses is included in a single code. Also, pulse modulation is performed using an No count of samples per sub-pulse, so there are Nr(No×L) samples in each code transmission slot Tw. Further, an Nu count of samples is included in the non-transmission slot (Tr−Tw) of the radar transmission cycle Tr.

Figure 4:
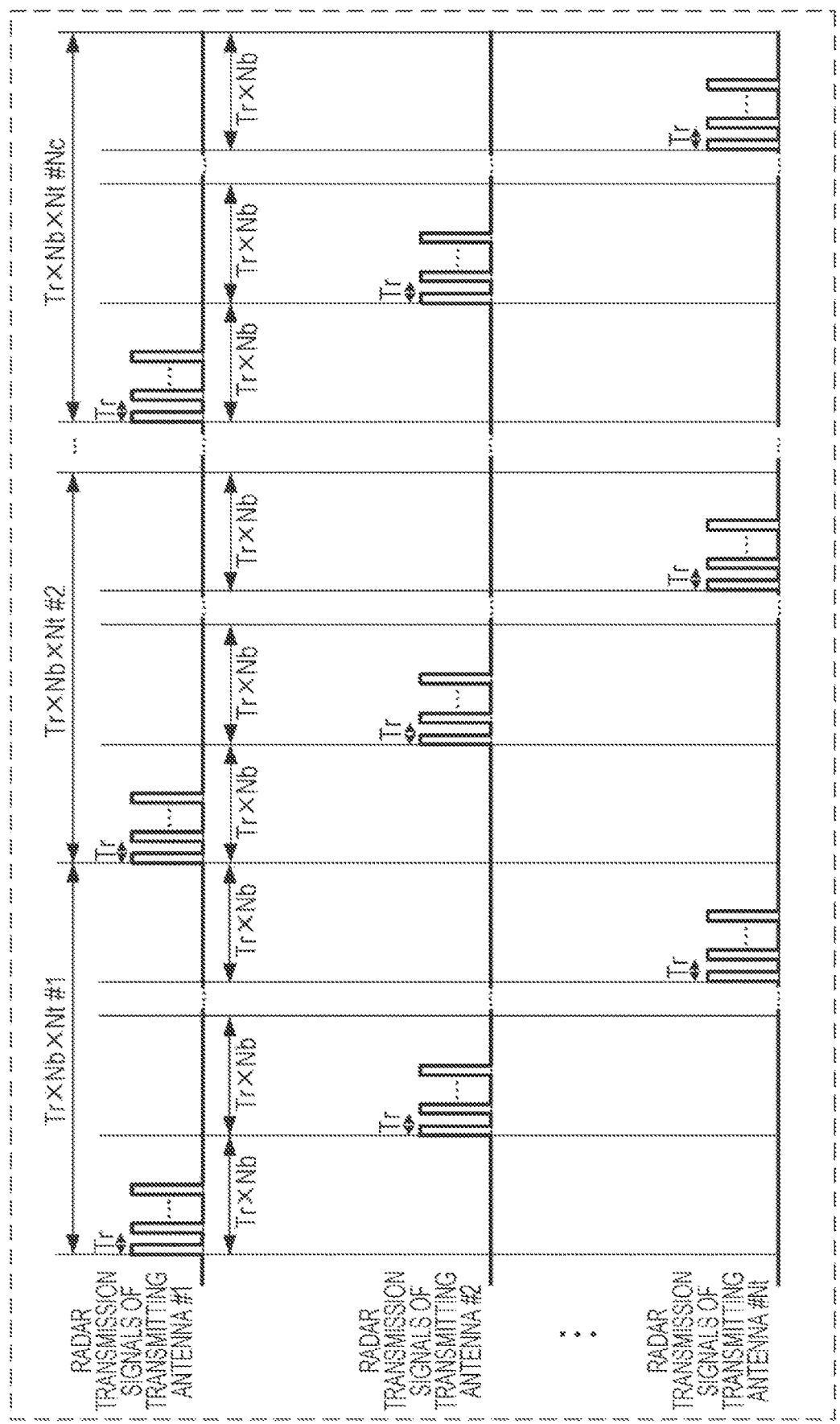
FIG. 4 is a diagram illustrating an example of time division switching operations of a transmitting antenna by a control unit according to the first embodiment.

FIG. 4 illustrates an example of time division switching operations of the transmitting antenna elements #1 through #Nt by the control unit 400 according to the present disclosure. In FIG. 4, the control unit 400 outputs control signals (code control signals, transmission control signals) to instruct switching the output from the transmission antenna elements, in order from the transmitting antenna element #1 through the transmitting antenna element #Nt, to the radar transmitting unit 100 at each radar transmission cycle Tr. With the transmission output duration of each transmitting sub-array as (Tr×Nb), the control unit 400 effects control to repeat switching operations for the transmission output duration for all transmitting sub-arrays, which is (Tr×Np)=(Tr×Nb×Nt), Nc times. The later-described radar receiving unit 200 performs measurement processing based on the switching operations of the control unit 400.

For example, in a case of transmitting radar transmission signals from the transmitting antenna element #1, the control unit 400 outputs a transmission control signal to the transmission amplifying unit 107-1 connected to the transmitting antenna element #1, instructing amplification of input signals to a predetermined level, and outputs transmission control signals to the transmission amplifying units 107-2 through 107-Nt not connected to the transmitting antenna element #1, instructing to leave transmission output off.

In the same way, in a case of transmitting radar transmission signals from the transmitting antenna element #2, the control unit 400 outputs a transmission control signal to the transmission amplifying unit 107-2 connected to the transmitting antenna element #2, instructing amplification of input signals to a predetermined level, and outputs transmission control signals to the transmission amplifying units 107 not connected to the transmitting antenna element #2, instructing to leave transmission output off. Thereafter the control unit 400 performs the same control to the transmitting antenna elements #3 through #Nt in order. This so far has been a description of output switching operations of radar transmission signals by the control unit 400.

Another Configuration of Radar Transmitting Unit 100

Figure 5:
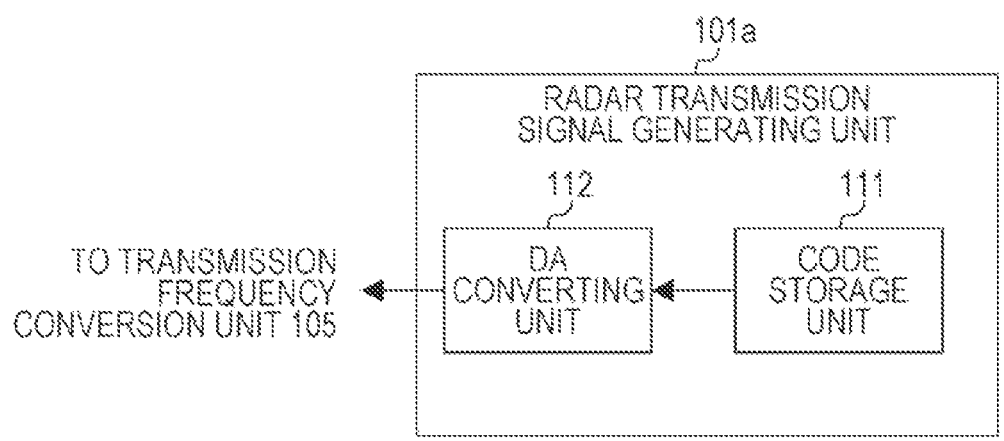
FIG. 5 is a block diagram illustrating an example of another configuration of a radar transmission signal generating unit according to the first embodiment.

FIG. 5 is a block diagram illustrating an example of another configuration of the radar transmission signal generating unit 101 according to the present disclosure. The radar transmitting unit 100 may have, instead of the radar transmission signal generating unit 101, a radar transmission signal generating unit 101a illustrated in FIG. 5. The radar transmission signal generating unit 101a does not have the code generating unit 102, modulating unit 103, and the LPF 104, illustrated in FIG. 2, and instated has a code storage unit (code storage circuit) 111 and DA converting unit (DA converting circuit) 112 illustrated in FIG. 5.

The code storage unit 111 stores a code sequence generated at the code generating unit 102 illustrated in FIG. 2 beforehand, and cyclically reads out the stored code sequence in order. The DA converting unit 112 converts the code sequence (digital signals) output from the code storage unit 111 into analog baseband signals.

Configuration of Radar Receiving Unit 200

Figure 6:
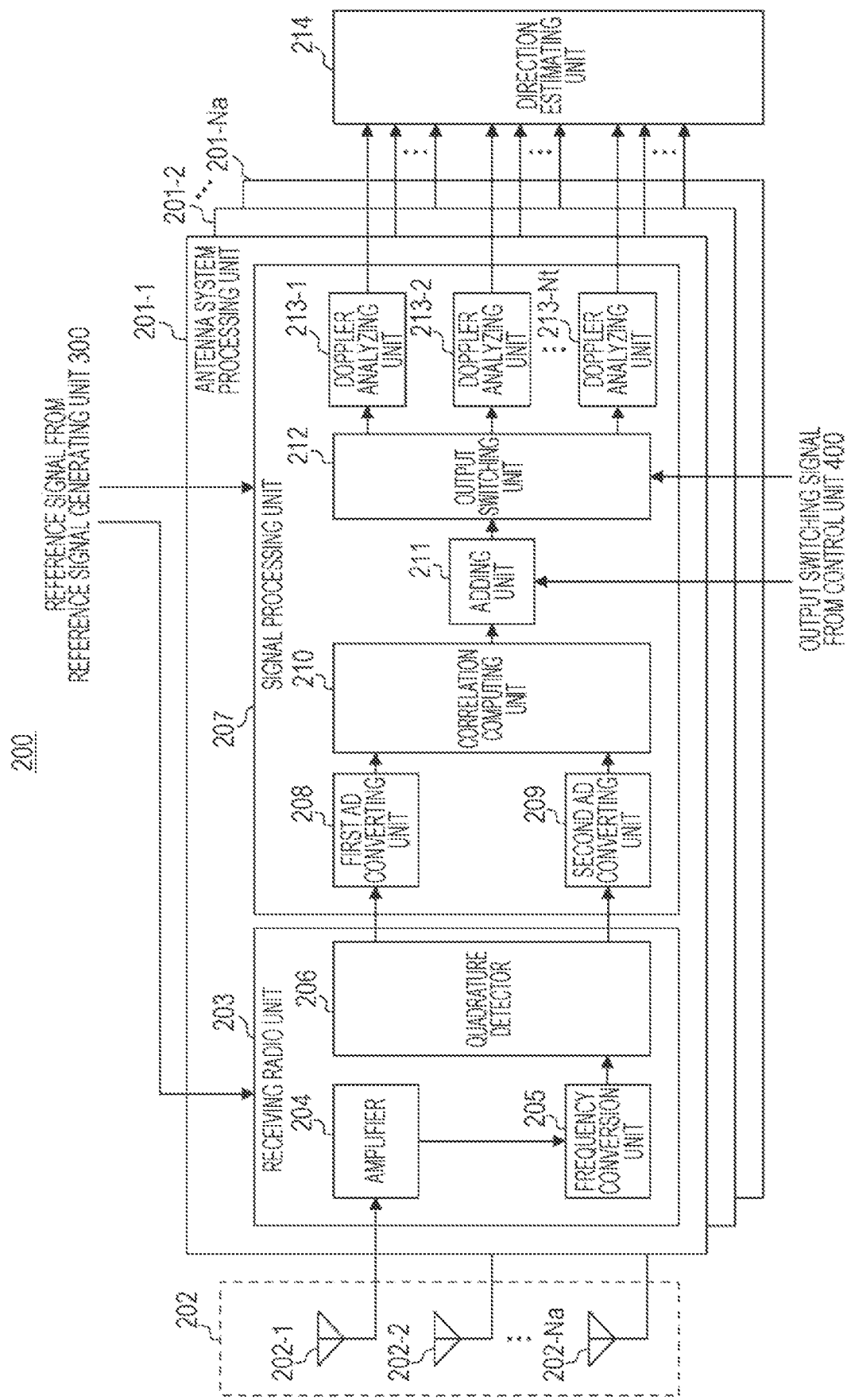
FIG. 6 is a block diagram illustrating an example of the configuration of a radar receiving unit according to the first embodiment.

FIG. 6 is a block diagram illustrating an example of the configuration of the radar receiving unit 200 according to the first and second embodiments. The radar receiving unit 200 has a receiving array antenna 202, an Na count of antenna element system processing units (antenna element system processing circuits) 201 (201-1 through 201-Na), and a direction estimating unit (direction estimating circuit) 214.

The receiving array antenna 202 has an Na count of receiving antenna elements #1 through #Na (202-1 through 202-Na), The Na count of receiving antenna elements 202-1 through 202-Na receive returning wave signals that are radar transmission signals that have reflected off of a reflecting object including a measurement target (object), and outputs the received returning wave signals to the respectively corresponding antenna element system processing units 201-1 through 201-Na as reception signals.

The antenna element system processing units 201 (201-1 through 201-Na) each have a receiving radio unit (receiving radio circuit) 203 and a signal processing unit (signal processing circuit) 207. The receiving radio unit 203 and signal processing unit 207 generate a timing clock (reference clock signal) where a reference signal received from the reference signal generating unit 300 is multiplied by a predetermined number, and operate based on the generated timing clock, thereby ensuring synchronism with the radar transmitting unit 100.

The receiving radio units 203 each have an amplifying unit (amplifying circuit) 204, a frequency converter (frequency conversion circuit) 205, a quadrature detector (quadrature detecting circuit) 206. Specifically, at the z'th receiving radio unit 203, the amplifier 204 amplifies reception signals received from the z'th receiving antenna element #z to a predetermined level, where z=1, . . . , Nr. Next, the frequency conversion unit 205 performs frequency conversion of high-frequency-band reception signals to baseband range. Thereafter, the quadrature detector 206 converts the baseband range reception signals into baseband range reception signals including I signals and Q signals.

The signal processing units 207 each have a first AD converting unit (AD converting circuit) 208, a second AD converting unit (AD converting circuit) 209, a correlation computing unit (correlation computing circuit) 210, an adding unit (adding circuit) 211, an output switching unit (output switching circuit) 212, and an Nt count of doppler analyzing units (doppler analyzing circuits) 213-1 through 213-Nt.

The first AD converting unit 208 inputs I signals from the quadrature detector 206. The first AD converting unit 208 performs discrete-time sampling of baseband signals including I signals, thereby converting the I signals into digital data.

The second AD converting unit 209 inputs Q signals from the quadrature detector 206. The second AD converting unit 209 performs discrete-time sampling of baseband signals including Q signals, thereby converting the Q signals into digital data.

Now, in the sampling by the first AD converting unit 208 and second AD converting unit 209, an Ns count of discrete samples are taken per time Tp (i.e., Tw/L) of a single sub-pulse in radar transmission signals. That is to say, the oversampling count per sub-pulse is Ns.

Figure 7:
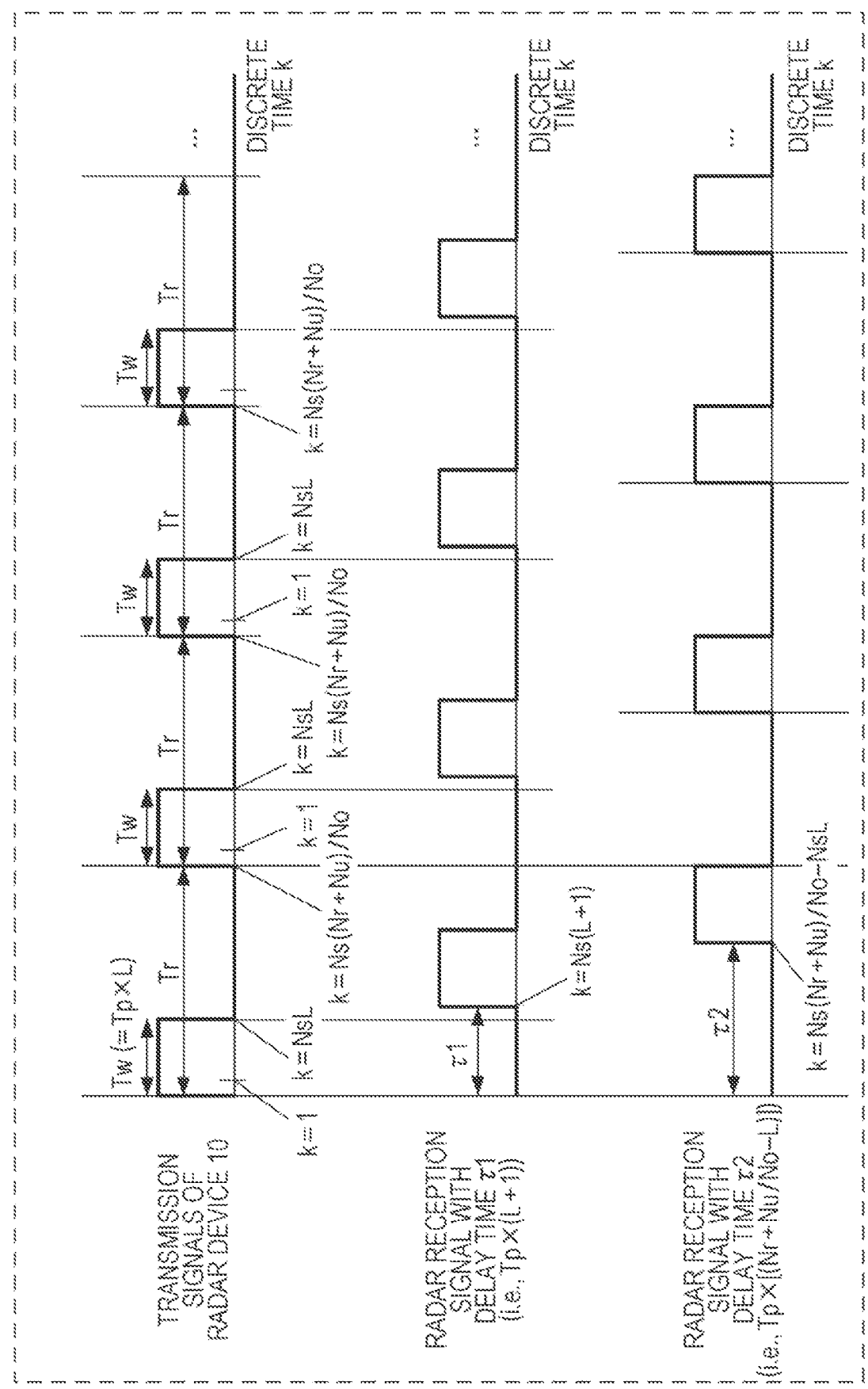
FIG. 7 is a diagram illustrating an example of transmission timing of radar transmission signals and measurement range of the radar device according to the first embodiment.

FIG. 7 illustrates an example of transmission timing of radar transmission signals and measurement range of the radar device 10 according to the present disclosure. In the following description, the baseband reception signals at discrete time k in an M'th radar transmission cycle Tr[M] as the output of the first AD converting unit 208 and second AD converting unit 209 are expressed as complex number signals $x_z(k, M) M)=I_z(k, M)+jQ_z(k, M)$, using I signal $I_z(k, M)$ and Q signal $Q_z(k, M)$. Also note that in the following, the discrete time k uses the timing as which the radar transmission cycle (Tr) starts as a reference (k=1), and the signal processing unit 207 cyclically performs measurement up to a sample point k $(N_r+N_u) N_s/N_o$ before the radar transmission cycle Tr ends. That is to say, k=1, . . . , $(N_r+N_u) N_s/N_o$ holds. Also, j is an imaginary unit here.

At the z'th signal processing unit 207, the correlation computing unit 210 performs correlation computation between discrete sample value $x_z(k, M)$ received from the first AD converting unit 208 and second AD converting unit 209, and pulse code $a_n(M)$ of a code length L (where z=1, . . . , Na, and n=1, . . . , L) transmitted by the radar transmitting unit 100, for each radar transmission cycle Tr. For example, the correlation computing unit 210 performs sliding correlation computation between discrete sample value $x_z(k, M)$ and pulse code $a_n(M)$. For example, correlation computation value $AC_z(k, M)$ from sliding correlation computation of discrete time k at the M'th radar transmission cycle Tr[M] is calculated based on Expression (1)

$$AC_z(k,M)=\Sum_{n=1}^{L} x_z(k+N_s(n-1),M)a_n(M)^* \quad (1)$$

where the asterisk "*" represents a complex conjugate operator.

The correlation computing unit 210 performs correlation computation over a period k=1, . . . , $(N_r+N_u) N_s/N_o$, for example, in accordance with Expression (1). Note however, that the correlation computing unit 210 is not restricted to cases of performing correlation computation over a period k=1, . . . , $(N_r+N_u) N_s/N_o$, and that the measurement range (I.e., the range of k) may be restricted in accordance with the range where the target that is the object of measurement by the radar device 10 is present. This restriction reduces the amount of computation processing at the correlation computing unit 210. For example, the measurement range of the correlation computing unit 210 may be restricted to k=$N_s$ (L+1), . . . , $(N_r+N_u) N_s/N_o-N_sL$. In this case, the radar device 10 does not perform measurement in a time slot corresponding to code transmission slot Tw, as illustrated in FIG. 7.

According to the above-described configuration, even in a case where there is direct leakage of radar transmission signals at the radar receiving unit 200, processing by the correlation computing unit 210 is not performed during the period where there is leakage of radar transmission signals (at least during a period below τ1). Accordingly, the radar device 10 is capable of measurement with the effects of leakage eliminated. Also, in a case of restricting the measurement range (range of k), processing can be applied in the same way with the measurement range (range of k) restricted with regard to the processing at the adding unit 211, output switching unit 212, doppler analyzing unit 213, and direction estimating unit 214, which will be described below. Accordingly, the amount of processing at each component can be restricted, and the power consumption of the radar receiving unit 200 can be reduced.

At the z'th signal processing unit 207, the adding unit 211 performs addition (coherent integration) processing using the correlation computation value $AC_z(k, M)$ received from the correlation computing unit 210 each discrete time k, with a period ($T_r \times N_b$) of multiple times Nb in radar transmission cycles Tr continuously transmitted from the $N_D$'th transmitting antenna element $\#N_D$ as an increment, based on output switching signals output from the control unit 400. Note that $N_D=1, \ldots, Nt$, and $z=1, \ldots, Na$ here.

The addition processing (coherent integration) spanning the period ($T_r \times Nb$) is represented by the following Expression (2)

$$CI_z^{(ND)}(k,m) = \sum_{g=1}^{Nb} AC_z(k,(N \times N_b)(m-1)+(N_D-1) \times N_b + g) \quad (2)$$

where $CI_z^{(ND)}(k, m)$ represents the addition value of correlation computation values (hereinafter referred to as correlation addition value), m is an integer of 1 or greater indicating an ordinal number of the number of times of addition at the adding unit 211, and $z=1, \ldots, Na$.

In order to obtain ideal addition gain is for the phase component of correlation computation values to be preferably aligned to a certain extent in the addition range of correlation computation values. That is to say, the number of times of addition preferably is set based on the estimated greatest velocity of movement of the target that is the object of measurement. The reason is that the greater the velocity of movement of the target is, the greater the variation of doppler frequency contained in waves reflected from the target is, and the temporal period where there is a high correlation is short, so Np (i.e., N×Nb) is a small value, and the advantages of increased gain by addition at the adding unit 211 decreases.

At the z'th signal processing unit 207, the output switching unit 212 selectively switches and outputs $CI_z^{(ND)}(k, m)$ to the $N_D$'th doppler analyzing unit 213-$N_D$, based on output switching signals output from the control unit 400. Note that $CI_z^{(ND)}(k, m)$ is the addition results for each discrete time k, where addition has been performed in increments of multiple Nb periods ($T_r \times Nb$) of radar transmission cycles Tr continuously transmitted from the $N_D$'th transmitting antenna element. Note that $N_D=1, \ldots, Nt$, and $z=1 \ldots, Na$, here.

The signal processing unit 207 has doppler analyzing unit 213-1 through 213-Nt, of the same count Nt as the transmitting antenna elements #1 through #Nt. The doppler analyzing unit 213 (213-1 through 213-Nt) performs coherent integration with the timing of discrete time k aligned, with $CI_z^{(ND)}(k, N_C(w-1)+1)$ through $CI_z^{(ND)}(k, N_C \times w)$ that is the output of a count $N_C$ of adding units 211 obtained each discrete time k as an increment. For example, the doppler analyzing unit 213 performs coherent integration after having corrected phase variation $\Phi(f_s)=2\pi f_s(T_r \times N_b) \Delta\Phi$ in accordance with a count 2Nf of different doppler frequencies $f_s \Delta\Phi$ as shown in the following Expression (3)

$$FT\_CI_z^{(ND)}(k, f_s, w) = \quad (3)$$
$$\sum_{q=0}^{N_c-1} CI_z^{(ND)}(k, N_c(w-1)+q+1)\exp[-j\Phi(f_s)q] =$$
$$\sum_{q=0}^{N_c-1} CI_z^{(ND)}(k, N_c(w-1)+q+1)\exp[-j2\pi f_s T_r N_b q \Delta\Phi]$$

where $FT\_CI_z^{(ND)}(k, f_s, w)$ is the w'th output at the $N_D$'th doppler analyzing unit 213-$N_D$ in the z'th signal processing unit 207, and indicates the results of coherent integration of doppler frequencies $f_s \Delta\Phi$ at discrete time k, with regard to the $N_D$'th output of the adding unit 211. Note that $N_D=1, \ldots, Nt$ holds, $f_s=-Nf+1, \ldots, 0, Nf$ holds, $k=1, \ldots, (Nr+Nu) Ns/No$ holds, w is a natural number, $\Delta\Phi$ is a phase rotation unit, j is an imaginary unit, and $z=1, \ldots, Na$ holds.

Accordingly, the signal processing unit 207 can obtain $FT\_CI_z^{(ND)}(k, -Nf+1, w), \ldots, FT\_CI_z^{(ND)}(k, Nf-1, w)$ that is the results of coherent integration in accordance with a count 2Nf of doppler frequency components every discrete time K each period ($Tr \times Nb \times Nc$) of multiple times Nb×Nc of radar transmission cycles Tr.

In a case where $\Delta\Phi=1/N_c$, the processing at the doppler analyzing unit 213 described above is equivalent to performing discrete Fourier transform (DFT) processing of the output of the adding unit 211 at a sampling interval $T_m=(Tr \times N_p)$ and a sampling frequency $f_m=1/T_m$.

Setting Nf to be a number that is a power of 2 enables the doppler analyzing unit 213 to apply fast Fourier transform (FFT) processing, and the amount of computation processing can be reduced. Note that when Nf>Nc, performing zero padding processing where $CI_z^{(ND)}(k, Nc(w-1)+1)=0$ in the region where q>Nc holds similarly enables FFT processing to be applied, and the amount of computation processing can be reduced.

Also, the doppler analyzing unit 213 may perform processing of successively computing the multiply-add operation in Expression (3) above, instated of FFT processing. That is to say, the doppler analyzing unit 213 may generate a coefficient $\exp[-j2\pi f_s T_r N_b q \Delta\Phi]$ corresponding to $f_s=-Nf+1, \ldots, 0, Nf$, with regard to $CI_z^{(ND)}(k, Nc(w-1)+q+1)$ that is Nc outputs of the adding unit 211 obtained at each discrete time k, and successively perform multiply-add processing. Note that $q=0 \ldots, N_c-1$ here.

Note that in the following description, the w'th output $FT\_CI_z^{(1)}(k, f_s, w), \ldots, FT\_CI_z^{(Na)}(k, f_s, w)$, obtained by performing the same processing on each of the signal processing unit 207 of the first antenna element system processing unit 201-1 through the Na'th antenna element system processing unit 201-Na, will be written as a virtual receiving array correlation vector $h(k, f_s, w)$ in the following Expression (4) (or Expression (5)).

$$h(k, fs, w) = \quad (4)$$

$$\begin{bmatrix} FT\_CI_1^{(1)}(k, f_s, w) \\ FT\_CI_1^{(2)}(k, f_s, w)\exp(-j2\pi f_s\Delta\Phi T_r N_b) \\ \vdots \\ FT\_CI_1^{(N)}(k, f_s, w)\exp(-j2\pi f_s\Delta\Phi(N-1)T_r N_b) \\ FT\_CI_2^{(1)}(k, f_s, w) \\ FT\_CI_2^{(2)}(k, f_s, w)\exp(-j2\pi f_s\Delta\Phi T_r N_b) \\ \vdots \\ FT\_CI_2^{(N)}(k, f_s, w)\exp(-j2\pi f_s\Delta\Phi(N-1)T_r N_b) \\ \vdots \\ FT\_CI_{Na}^{(1)}(k, f_s, w) \\ FT\_CI_{Na}^{(2)}(k, f_s, w)\exp(-j2\pi f_s\Delta\Phi T_r N_b) \\ \vdots \\ FT\_CI_{Na}^{(N)}(k, f_s, w)\exp(-j2\pi f_s\Delta\Phi(N-1)T_r N_b) \end{bmatrix} = \begin{bmatrix} h_1(k, fs, w) \\ h_2(k, fs, w) \\ \vdots \\ h_{Na}(k, fs, w) \end{bmatrix}$$

$$h_z(k, fs, w) = \begin{bmatrix} FT\_CI_z^{(1)}(k, f_s, w) \\ FT\_CI_z^{(2)}(k, f_s, w)\exp(-j2\pi f_s\Delta\Phi T_r N_b) \\ \vdots \\ FT\_CI_z^{(N)}(k, f_s, w)\exp(-j2\pi f_s\Delta\Phi(N-1)T_r N_b) \end{bmatrix} \quad (5)$$

The virtual receiving array correlation vector $h(k, f_s, w)$ includes Nt×Na elements, being the product of the count Nt of transmitting antenna elements #1 through #Nt and the count Na of receiving antenna elements #1 through #Na. This virtual receiving array correlation vector $h(k, f_s, w)$ is used in description of processing where direction estimation processing is performed based on phase difference among the receiving antenna elements #1 through #Na as to returning wave signals from the target, which will be described later. Note that $z=1, \ldots, Na$ and $N_D=1, \ldots, Nt$ here.

In the above-described Expressions (4) and (5), phase rotation for each doppler frequency ($f_s\Delta\Phi$), due to difference in transmission time from the transmitting sub-arrays, is corrected. That is to say, reception signal $FT\_CI_z^{(Na)}(k, f_s, w)$ of the doppler frequency ($f_s\Delta\Phi$) component from the $N_D$'th transmitting sub-array is multiplied by $\exp[-j2\pi f_s\Delta\Phi(N_D-1)T_r N_b]$, with the first transmitting sub-array ($N_D=1$) as a reference. This so far has been description of processing by the components of the signal processing unit 207.

The direction estimating unit 214 calculates a virtual receiving array correlation vector $h_{after\_cal}(k, f_s, w)$ where inter-antenna deviation has been corrected, by multiplying the virtual receiving array correlation vector h $(k, f_s, w)$ of the w'th doppler analyzing unit 213 output from the signal processing unit 207 of the first antenna element system processing unit 201-1 through the signal processing unit 207 of the Na'th antenna element system processing unit 201-Na, by an array correction value $h_{cal[b]}$ that corrects phase-shift deviation and amplitude deviation between the transmission array antenna 108 and the receiving array antenna 202, as in the following Expression (6). Note that $b=1, \ldots, (Nt\times Na)$ here.

$$h_{after\_cal}(k, fs, w) = CA \, h(k, fs, w) = \begin{bmatrix} h_1(k, fs, w) \\ h_2(k, fs, w) \\ \vdots \\ h_{Na\times Nr}(k, fs, w) \end{bmatrix} \quad (6)$$

$$CA = \begin{bmatrix} h\_cal_{[1]} & 0 & \cdots & 0 \\ 0 & h\_cal_{[2]} & \cdots & 0 \\ \vdots & & \ddots & \vdots \\ 0 & \cdots & 0 & h\_cal_{[Nt\times Na]} \end{bmatrix}$$

The virtual receiving array correlation vector $h_{after\_cal}(k, f_s, w)$ where inter-antenna deviation has been corrected is a column vector made up of Na×Nr elements. The elements of the virtual receiving array correlation vector $h_{after\_cal}(k, f_s, w)$ will be written as $h_1(k, f_s, w), \ldots, h_{Na\times Nr}(k, fs, w)$ and used in description of direction estimating processing below.

The direction estimating unit 214 then uses the virtual receiving array correlation vector $h_{after\_cal}(k, f_s, w)$ to perform estimation processing of the direction of arrival of reflected wave signals, based on the phase difference of reflected wave signals among the receiving antenna elements 202-1 through 202-Na. The direction estimating unit 214 calculates a spatial profile with an azimuth θ in a direction estimation evaluation function value $P_H(\theta, k, fs, w)$ variable over a predetermined angular range, extracts a predetermined number of maximal peaks in the calculated spatial profile, in order from the largest, and the directions of the maximal peaks are taken as estimation values of the direction of arrival.

There are various types of the estimation evaluation function value $P_H(\theta, k, fs, w)$ depending on the direction of arrival estimation algorithm. For example, an estimation method using an array antenna that is disclosed in "Direction-of-arrival estimation using signal subspace modeling", Cadzow. J. A., Aerospace and Electronic Systems, IEEE Transactions on Volume: 28, Issue: 1 Publication Year: 1992, Page(s): 64-79, may be used.

Beamforming, for example, can be expressed as in the following Expressions (7) and (8)

$$P_H(\theta_u, k, fs, w) = |a_H(\theta_u)^H h_{after\_cal}(k, fs, w)|^2 \quad (7)$$

$$a_H(\theta_u) = \begin{bmatrix} 1 \\ \exp\{-j2\pi d_H \sin\theta_u/\lambda\} \\ \vdots \\ \exp\{-j2\pi(N_{VAH}-1)d_H \sin\theta_u/\lambda\} \end{bmatrix} \quad (8)$$

where the superscript H is a Hermitian transpose operator, $a_H(\theta_u)$ indicates the direction vector of the virtual receiving array as to waves arriving from azimuth $\theta_u$, and $\theta_u$ is changed by a predetermined direction interval $\beta_1$ within the range of direction in which arrival direction estimation is performed. This $\theta_u$ is, for example, set as follows $\theta_u = \theta \min + u\beta_1, u=0, \ldots, NU$ $NU = \text{floor}[(\theta \max - \theta \min)/\beta_1]+1$ where floor(x) is a function that returns the largest integer value that does not exceed real number x. Note that techniques such as Capon, MUSIC, and so forth may be applied in the same way, instead of beamforming.

Figure 8:
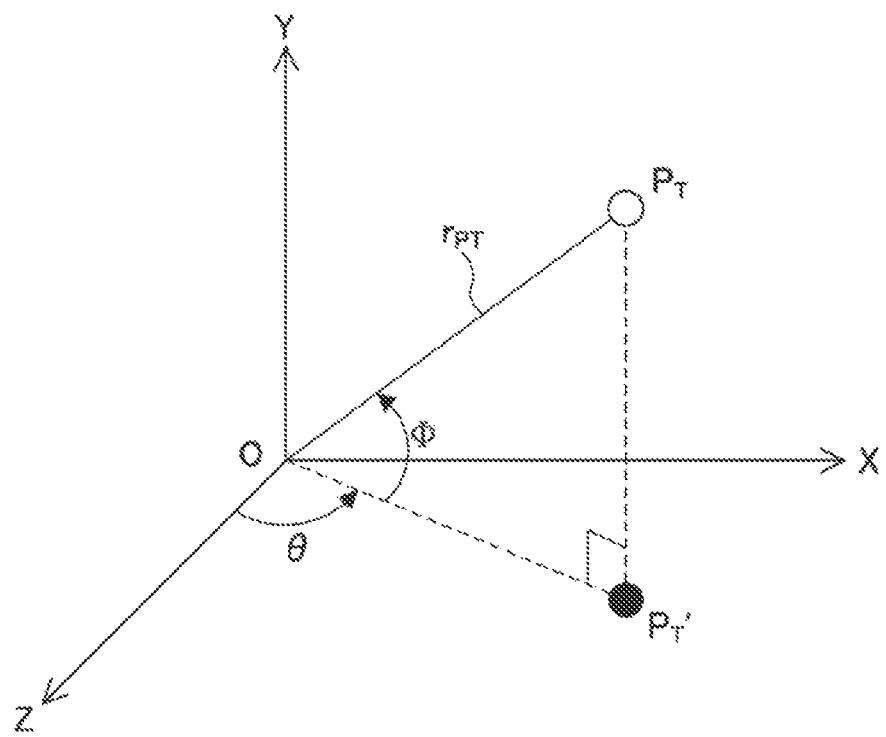
FIG. 8 is a diagram illustrating a three-dimensional coordinate system used to describe operations of a direction estimating unit according to the first embodiment.

FIG. 8 illustrates a three-dimensional coordinates system used for description of operations of the direction estimating unit 214 according to the present disclosure. Description will be made below regarding a case where estimation processing is made in two-dimensional directions, by applying the processing of the direction estimating unit 214 to the three-dimensional coordinates system illustrated in FIG. 8.

In FIG. 8, the positional vector of target $P_T$ is defined as $r_{PT}$, with the origin O as a reference. Also, a projection point where the positional vector $r_{PT}$ of the target $P_T$ is projected on the XZ plane is $P_T'$ in FIG. 8. In this case, the azimuth θ is defined as an angle formed between line O-$P_T'$ and the Z axis (θ>0 in a case where the X coordinate of target $P_T$ is positive). Elevation Φ is defined as the angle between the target $P_T$ and a line connecting the origin O and projected point $P_T'$, within a plane including the target $P_T$, the origin O, and projected point $P_T'$ (Φ>0 in a case where the Y coordinate of the target $P_T$ is positive). Note that description will be made below with a case where the transmission array antenna 108 and receiving array antenna 202 are disposed within the XY plane, as one example.

The positional vector of the $n_{va}$'th antenna element in the virtual receiving array with the origin O as a reference is written as $Sn_{va}$. Note that $n_{va}=1, \ldots, $ Nt×Na here.

The positional vector $S_1$ of the first ($n_{va}=1$) antenna element in the virtual receiving array is decided based on the positional relation between physical position of the first receiving antenna element Rx #1 and the origin O. The positional vectors $S_2, \ldots, Sn_{va}$, of the other antenna elements in the virtual receiving array are decided in a state where the relative layout of the virtual receiving array, decided from the inter-element spacing of the transmission array antenna 108 and receiving array antenna 202 in the XY plane, is maintained, with the positional vector $S_1$ of the first antenna element as a reference. Note that the origin O may be made to coincide with the physical position of the first receiving antenna element Rx #1.

In a case of the radar receiving unit 200 receiving reflected waves from a target $P_T$ at a far field, the phase difference $d(r_{PT}, 2, 1)$ of reception signals at the second antenna element, with reception signals at the first antenna element of the virtual receiving array as a reference, is as shown in the following Expression (9)

$$d(r_{PT}, 2, 1) = -\frac{2\pi}{\lambda}\frac{\langle -r_{PT}, (S_2 - S_1)\rangle}{|r_{PT}|} = \frac{2\pi}{\lambda}\left\langle \frac{r_{PT}}{|r_{PT}|}, (S_2 - S_1)\right\rangle = \frac{2\pi}{\lambda}\left\langle \frac{r_{PT}}{|r_{PT}|}, D(2,1)\right\rangle \quad (9)$$

where <x, y> is an inner product operator of vector x and vector y.

The positional vector of the second antenna element, with the positional vector of the first antenna element of the virtual receiving array as a reference, is shown in the following expression (10) as inter-element vector D(2, 1).

$$D(2,1) = S_2 - S_1 \quad (10)$$

In the same way, in a case of the radar receiving unit 200 receiving reflected waves from a target $P_T$ at a far field, the phase difference $d(r_{PT}, n_{va}^{(t)}, n_{va}^{(r)})$ of reception signals at the $n_{va}^{(t)}$'th antenna element, with reception signals at the $n_{va}^{(r)}$'th antenna element of the virtual receiving array as a reference, is as shown in the following Expression (11)

$$d(r_{PT}, n_{va}^{(t)}, n_{va}^{(r)}) = \frac{2\pi}{\lambda}\left\langle \frac{r_{PT}}{|r_{PT}|}, D(n_{va}^{(t)}, n_{va}^{(r)})\right\rangle \quad (11)$$

where $n_{va}^{(r)}=1, \ldots, $ Nt×Na holds and $n_{va}^{(t)}=1, \ldots, $ Nt×Na holds.

The positional vector of the $n_{va}^{(t)}$'th antenna element, with the positional vector of the $n_{va}^{(r)}$'th antenna element of the virtual receiving array as a reference, is shown in the following expression (12) as inter-element vector $D(n_{va}^{(t)}, n_{va}^{(r)})$.

$$D(n_{va}^{(t)}, n_{va}^{(r)}) = S_{n_{va}^{(t)}} - S_{n_{va}^{(r)}} \quad (12)$$

The phase difference $d(r_{PT}, n_{va}^{(t)}, n_{va}^{(r)})$ of reception signals at the $n_{va}^{(t)}$'th antenna element, with reception signals at the $n_{va}^{(r)}$'th antenna element of the virtual receiving array as a reference, is dependent on unit vector ($r_{PT}/|r_{PT}|$) indicating the direction of the target $P_T$ at a far field and the inter-element vector $D(n_{va}^{(t)}, n_{va}^{(r)})$, as shown in the above-described Expressions (11) and (12).

Also, in a case where the virtual receiving array exists within the same plane, the inter-element vector $D(n_{va}^{(t)}, n_{va}^{(r)})$ exists on the same plane. The direction estimating unit 214 uses part or all of such inter-element vectors to configure a virtual plane layout array antenna assuming that antenna elements virtually exist at positions indicated by the inter-element vectors, and performs two-dimensional direction estimation processing. That is to say, the direction estimating unit 214 performs direction of arrival estimation processing using multiple virtual antennas interpolated by interpolation processing with regard to antenna elements making up the virtual receiving array.

In a case where virtual antenna elements overlap, the direction estimating unit 214 may fixedly select one of the overlapping antenna elements beforehand. Alternatively, the direction estimating unit 214 may perform averaging processing using reception signals at all overlapping virtual antenna elements.

Description will be made below regarding two-dimensional direction estimation processing using beamforming, in a case where the virtual plane layout array antenna has been configured using a $N_q$ count of inter-element vector groups. The nq'th inter-element vector making up the virtual plane layout array antenna will be written as $D(n_{va(nq)}^{(t)}, n_{va(nq)}^{(r)})$, where nq=1, ..., Nq holds.

The direction estimating unit 214 generates the virtual plane layout array antenna correlation vector $h_{VA}(k, fs, w)$ shown in Expression (13) below, using $h_1(k, fs, w), \ldots, h_{Na \times N}(k, fs, w)$ that are elements of the virtual receiving array correlation vector $h\_{after\_cal}(k, fs, w)$.

$$h_{VA}(k, fs, w) = CA\, h(k, fs, w) = \begin{bmatrix} h_{n_{va(1)}^{(t)}}(k, fs, w) h^*_{n_{va(1)}^{(r)}}(k, fs, w) / \left|h^*_{n_{va(1)}^{(r)}}(k, fs, w)\right| \\ h_{n_{va(2)}^{(t)}}(k, fs, w) h^*_{n_{va(2)}^{(r)}}(k, fs, w) / \left|h^*_{n_{va(2)}^{(r)}}(k, fs, w)\right| \\ \vdots \\ h_{n_{va(N_q)}^{(t)}}(k, fs, w) h^*_{n_{va(N_q)}^{(r)}}(k, fs, w) / \left|h^*_{n_{va(N_q)}^{(r)}}(k, fs, w)\right| \end{bmatrix} \quad (13)$$

The following Expression (14) shows a virtual plane layout array direction vector $a_{VA}(\theta u, \Phi v)$.

$$a_{VA}(\theta_u, \Phi_v) = \begin{bmatrix} \exp\left\{j\frac{2\pi}{\lambda}\left\langle \frac{r_{PT}(\theta_u, \Phi_v)}{|r_{PT}(\theta_u, \Phi_v)|}, D(n_{va(1)}^{(t)}, n_{va(1)}^{(r)})\right\rangle\right\} \\ \exp\left\{j\frac{2\pi}{\lambda}\left\langle \frac{r_{PT}(\theta_u, \Phi_v)}{|r_{PT}(\theta_u, \Phi_v)|}, D(n_{va(2)}^{(t)}, n_{va(2)}^{(r)})\right\rangle\right\} \\ \vdots \\ \exp\left\{j\frac{2\pi}{\lambda}\left\langle \frac{r_{PT}(\theta_u, \Phi_v)}{|r_{PT}(\theta_u, \Phi_v)|}, D(n_{va(N_q)}^{(t)}, n_{va(N_q)}^{(r)})\right\rangle\right\} \end{bmatrix} \quad (14)$$

The relation between the unit vector ($r_{PT}/|r_{PT}|$) indicating the direction of the target $P_T$, and the azimuth θ and the elevation Φ, in a case where the virtual receiving array is in the XY plane, is as shown in the following Expression (15).

$$\frac{r_{PT}(\theta_u, \Phi_v)}{|r_{PT}(\theta_u, \Phi_v)|} = \begin{pmatrix} \sin\theta_u \cos\Phi_v \\ \sin\Phi_v \\ \cos\theta_u \cos\Phi_v \end{pmatrix} \quad (15)$$

The direction estimating unit 214 calculates the unit vector ($r_{PT}/|r_{PT}|$) using the above Expression (15), for azimuth θu, elevation Φv regarding which the two-dimensional spatial profile in the vertical direction and horizontal direction is to be calculated. Further, the direction estimating unit 214 performs two-dimensional direction estimation processing in the horizontal direction and vertical direction, using the virtual plane layout array antenna correlation vector $h_{VA}(k, fs, w)$ and virtual plane layout array direction vector $a_{VA}(\theta u, \Phi v)$.

For example, in two-dimensional direction estimation processing using beamforming, the two-dimensional spatial profile in the vertical direction and horizontal direction is calculated using an evaluation function for two-dimensional direction estimation that is shown in the following Expression (16) using the virtual plane layout array antenna correlation vector $h_{VA}(k, fs, w)$ and virtual plane layout array direction vector $a_{VA}(\theta u, \Phi v)$. The azimuth and elevation exhibiting the greatest value or maximal value in the two-dimensional spatial profile is taken to be the estimation value for the direction of arrival.

$$P_{BA}(\theta_u, \Phi_v, k, fs, w) = |a_{VA}(\theta_u, \Phi_v)^N h_{VA}(k, fs, w)|^2 \quad (16)$$

Note that the direction estimating unit 214 may apply a high-resolution direction of arrival estimation algorithm such as Capon, MUSIC, or the like, using the virtual plane layout array antenna correlation vector $h_{VA}(k, fs, w)$ and virtual plane layout array direction vector $a_{VA}(\theta u, \Phi v)$, instead of beamforming. This increases the computation amount, but angular resolution can be raised.

Also, the above-described discrete time k may be output converted into distance information. The following Expression (17) can be used to convert the discrete time k into distance information R(k)

$$R(k) = k\frac{T_w C_0}{2L} \quad (17)$$

where Tw represents code transmission slot, L represents pulse code length, and $C_0$ represents the speed of light.

Further, doppler frequency information may be converted into relative speed component and output. The following Expression (18) can be used to convert the doppler frequency fsΔΦ into relative speed component $v_d(f_s)$ $$v_d(f_s) = \frac{\lambda}{2} f_s \Delta\Phi \quad (18)$$

where λ is the wavelength of the carrier frequency of RF signals output from the transmission frequency conversion unit 105.

Antenna Element Layout in Radar Device 10 According to First Embodiment

The layout of the lit transmitting antenna elements Tx #1 through #Nt of the transmission array antenna 108 and the Na receiving antenna elements Rx #1 through #Na of the receiving array antenna 202, in the radar device 10 having the above configuration, will be described below.

First Layout Example

Figure 9:
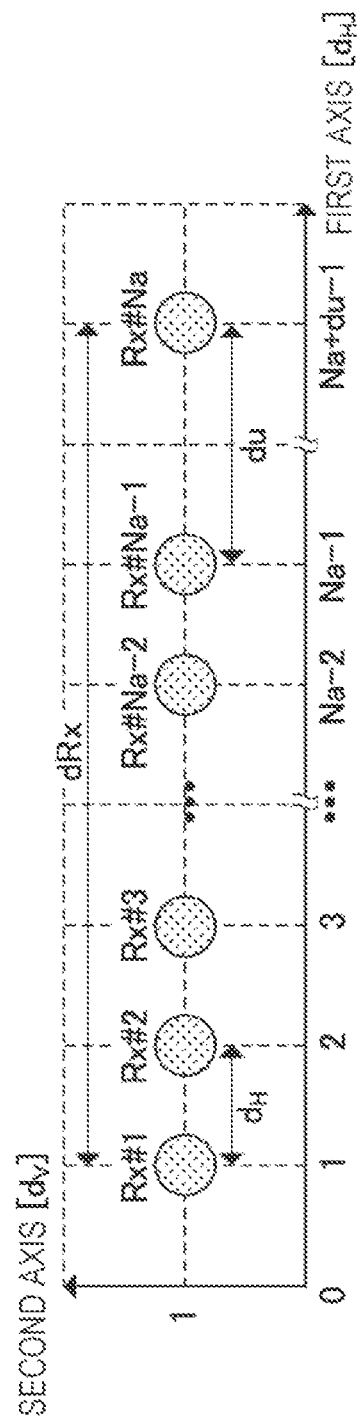
FIG. 9 is a diagram illustrating a first layout example of receiving antennas in a receiving array antenna according to the first embodiment.

FIG. 9 illustrates a first layout example of receiving antenna elements Rx #1 through Rx #Na of the receiving array antenna 202 according to the first embodiment. As illustrated in FIG. 9, the Na receiving antenna elements Rx #1 through Rx #Na of the receiving array antenna 202 are laid out following the first axis. The Na receiving antenna elements Rx #1 through Rx #Na are basically laid out equidistantly at a first spacing $d_H$, with a part thereof being laid out at a third spacing du that differs from the first spacing $d_H$. In other words, of the #Na-1 spacings that are the spacings among the Na adjacent receiving antenna elements Rx #1 through Rx #Na, part are equal to the third spacing du that differs from the first spacing, and the remainder are equal to the first spacing $d_H$.

Figure 10A:
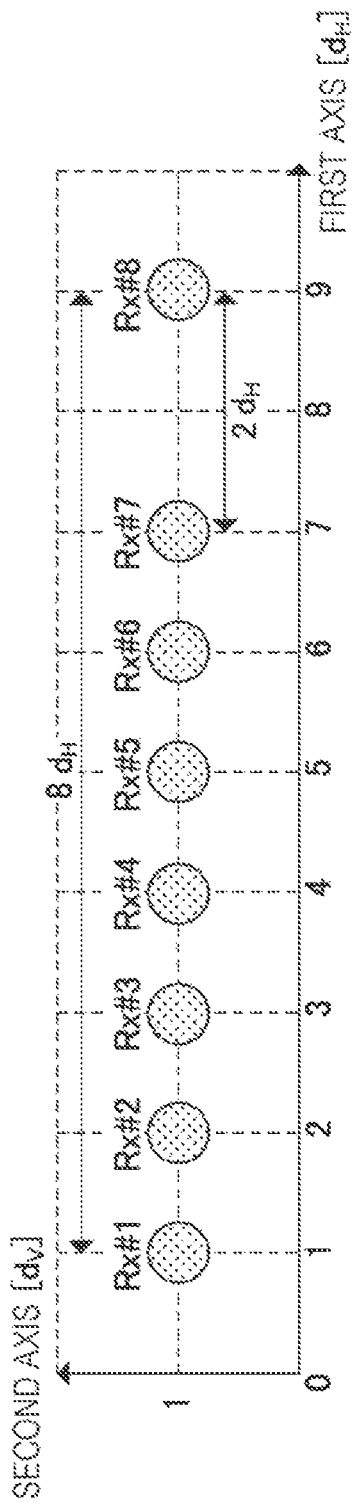
FIG. 10A is a diagram illustrating the first layout example of receiving antennas in a receiving array antenna according to the first embodiment.

FIG. 10A illustrates the first layout example of receiving antenna elements Rx #1 through Rx #8 of the receiving array antenna 202 according to the first embodiment. In the example illustrated in FIG. 10A, the receiving array antenna 202 has eight receiving antenna elements Rx #1 through Rx #8. Out of the eight receiving antenna elements Rx #1 through Rx #8, the receiving antenna elements Rx #1 through Rx #7 are disposed equidistantly at the first spacing $d_H$ following the first axis. The first spacing $d_H$ here is equal to 0.5 wavelengths, for example. The remaining receiving antenna element Rx #8 is disposed at the third spacing $2 \times d_H$ from the receiving antenna element Rx #7. That is to say, part of the receiving antenna elements Rx #1 through Rx #8 is laid out non-equidistantly. A synthesized aperture length dRx at the phase centers of the receiving antenna elements Rx #1 through Rx #8 is equal to $8 \times d_H$, which is the width of the receiving antenna elements Rx #1 through Rx #8 along the first axis.

Figure 10B:
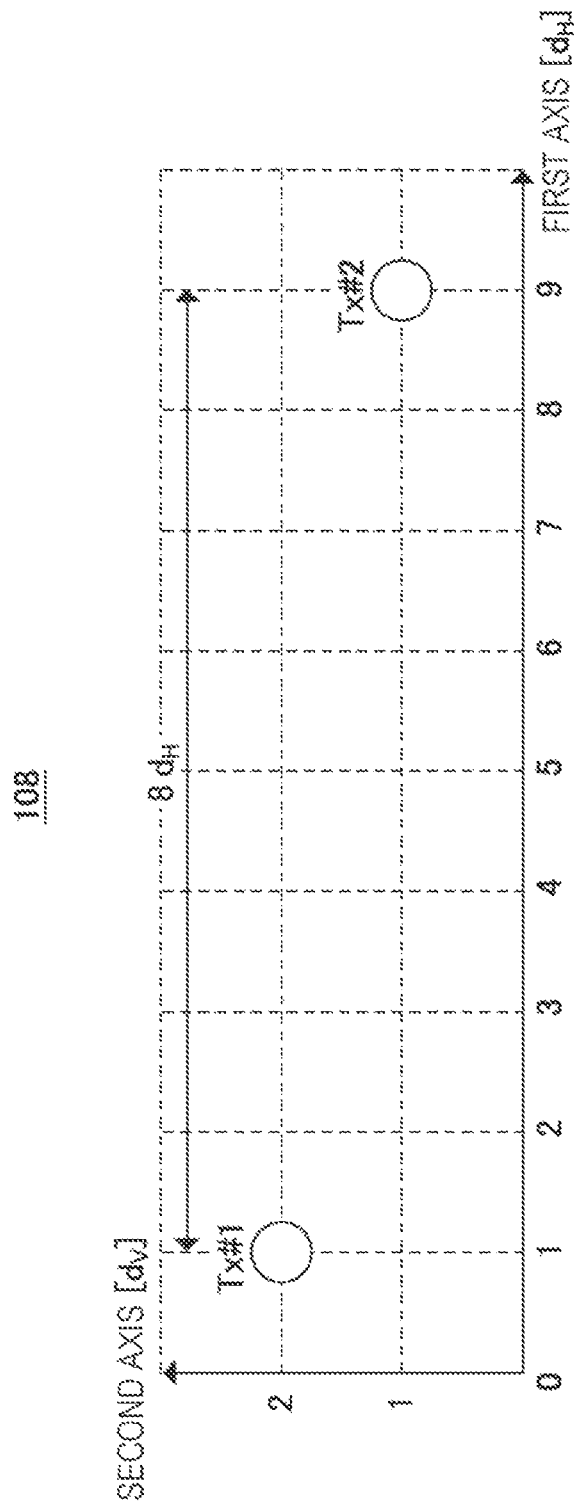
FIG. 10B is a diagram illustrating the first layout example of transmitting antennas in a transmitting array antenna according to the first embodiment.

FIG. 10B illustrates the first layout example of transmitting antenna elements Tx #1 and Tx #2 of the transmission array antenna 108 according to the first embodiment. In the example illustrated in FIG. 10B, the transmission array antenna 108 has two transmitting antenna elements Tx #1 and Tx #2. The transmitting antenna elements Tx #1 and Tx #2 are laid out at a spacing of $8 \times d_H$ in a first axis direction, and a spacing of $d_V$ in a second axis direction that is orthogonal to the first axis direction.

In one example, the first spacing $d_H$ and the second spacing of $d_V$ each may be 0.3 wavelengths or longer but two wavelengths or shorter, and may be around one-half wavelength. For example, the first spacing $d_H$ and the second spacing of $d_V$ may be equal to 0.5 wavelengths, with the wavelength used for radar transmission signals as a reference.

The first axis and second axis may be on the XY plane illustrated in FIG. 8, or may be disposed orthogonal to each other. For example, the first axis direction is the horizontal direction, and the second axis direction is the vertical direction. Description will be made below with the first axis direction agreeing with the horizontal direction and the second axis direction agreeing with the vertical direction, for the sake of ease of description.

In a case of using the transmission array antenna 108 illustrated in FIG. 10B in a usage of long-range measurement to measure ahead of a vehicle on a freeway, for example, the field of view (FoV) may be narrowed down to a narrow angle in the horizontal direction and vertical direction. The FoV may be around 30 degrees in the horizontal direction and around 10 degrees in the vertical direction, for example.

The aperture length of each receiving antenna element of the receiving array antenna 202 can be widened in the second axis direction and the beam width in the vertical direction be narrowed down, with the points illustrated in FIG. 10A (hatched circles) as the phase centers, thereby obtaining high antenna gain. Also, the aperture length of each transmitting antenna element of the transmission array antenna 108 can be widened in the first axis direction and second axis direction and the beam width in the horizontal direction and the vertical direction be narrowed down, with the points illustrated in FIG. 10B (blank circles) as the phase centers, thereby obtaining high antenna gain. Note that the antenna elements may be configured using sub-array antennas, and an array weight may be applied to the sub-array antenna to suppress sidelobes.

Note that dummy antenna elements may be disposed for the receiving antenna elements Rx #1 through Rx #8 laid out non-equidistantly as illustrated in FIG. 10A. A dummy antenna element is an antenna configured of antenna elements that have the same physical configuration as the other antenna elements, but is not used for transmission or reception of radar signals. For example, dummy antenna elements may be disposed in non-equidistant regions such as between the receiving antenna element Rx #7 and the receiving antenna element Rx #8, a region to the left side of the receiving antenna element Rx #1, or a region to the right side of the receiving antenna element Rx #8. Disposing dummy antenna elements yields the advantages of uniform effects of electric properties such as antenna radiation, impedance matching, and isolation, for example.

FIG. 10O illustrates a layout of a virtual receiving array according to the first layout example. It can be seen from FIG. 10O that a pair of virtual antenna elements VA #8 and VA #9 are laid out adjacently at a spacing of $d_V$ in the second axis direction. It can also be seen from FIG. 10O that the aperture length in the first axis direction of the virtual receiving array is equal to $16 \times d_H$.

A two-dimensional beam is configured by a two-dimensional virtual receiving array extending in the first axis direction and the second axis direction. The fact that the layout of the receiving antenna elements Rx #1 through Rx #8 and transmitting antenna elements Tx #1 and Tx #2 according to the first embodiment is an antenna layout that has high resolution in the horizontal direction and has angular estimation capabilities in the vertical direction will be demonstrated below with by way of a first comparative example and second comparative example.

First Comparative Example

Figure 11A:
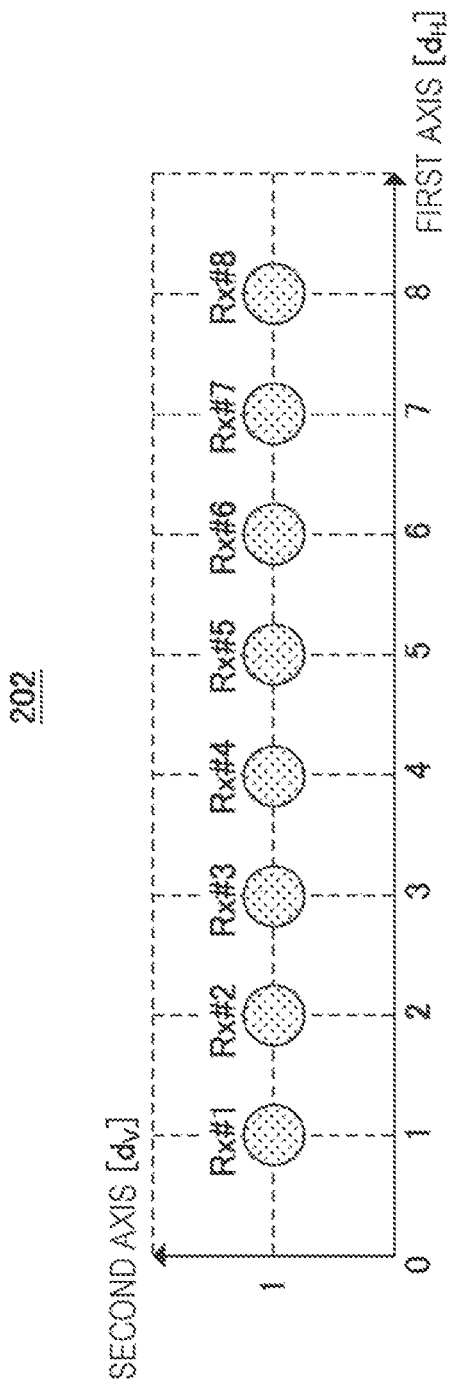
FIG. 11A is a diagram illustrating the layout of receiving antennas in a receiving array antenna according to a first comparative example.

FIG. 11A illustrates the layout of the receiving antenna elements Rx #1 through Rx #8 of the receiving array antenna according to the first comparative example. For the sake of comparison, the number of elements in the receiving antenna elements Rx #1 through Rx #8 illustrated in FIG. 11A is equal to the number of elements in the receiving antenna elements Rx #1 through Rx #8 illustrated in FIG. 10A. The receiving antenna elements Rx #1 through Rx #8 are laid out equidistantly at the first spacing $d_H$ in the first axis direction, as illustrated in FIG. 11A.

FIG. 11B illustrates the layout of the transmitting antenna elements Tx #1 and Tx #2 of the transmitting array antenna according to the first comparative example. For the sake of comparison, the number of elements in the transmitting antenna elements Tx #1 and Tx #2 illustrated in FIG. 11B is equal to the number of elements in the transmitting antenna elements Tx #1 and Tx #2 illustrated in FIG. 10B. The transmitting antenna elements Tx #1 and Tx #2 are laid out at a spacing of $7 \times d_H$ in the first axis direction, and at a spacing of $d_V$ in the second axis direction that is orthogonal to the first axis direction so that at least one part of the virtual receiving arrays is arrayed in the second axis direction.

FIG. 11C illustrates the layout of a virtual receiving array according to the first comparative example. It can be seen in FIG. 11C that in the virtual receiving array, VA #8 and VA #9 are laid out adjacently at a spacing of $d_V$ in the second axis direction, in the same way as illustrated in FIG. 10C. However, the aperture length in the first axis direction of the virtual receiving array is $14 \times d_H$, which is smaller than the aperture length in the first axis direction of the virtual receiving array according to the first embodiment that is $16 \times d_H$.

Figure 12:
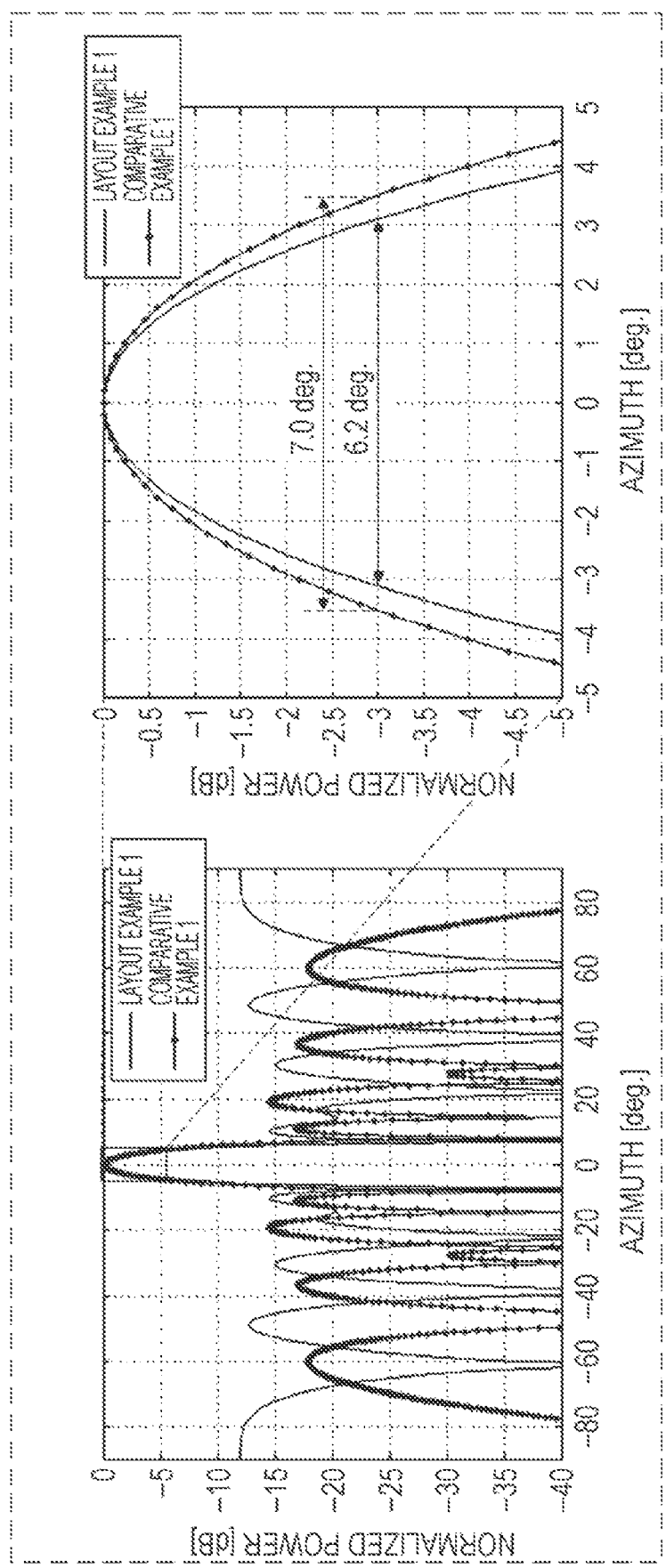
FIG. 12 is a cross sectional view of two-dimensional beams according to the first layout example and the first comparative example at 0 degrees in the second axis direction, taken along the first axis direction.

FIG. 12 is a cross sectional view of two-dimensional beams according to the first layout example and the first comparative example at 0 degrees in the second axis direction, taken along the first axis direction. The beam width 6.2 degrees corresponding to −3 dB according to the first embodiment is smaller than the beam width of 7.0 degrees according to the first comparative example as illustrated in FIG. 12. That is to say, the antenna layout according to the first embodiment yields higher resolution in the horizontal direction than the antenna layout according to the first comparative example. Note that when the field of view is narrowed in the horizontal direction, the magnitude of sidelobes at the wide-angle side do not substantially affect the probability of erroneous detection.

Second Comparative Example

Figure 13:
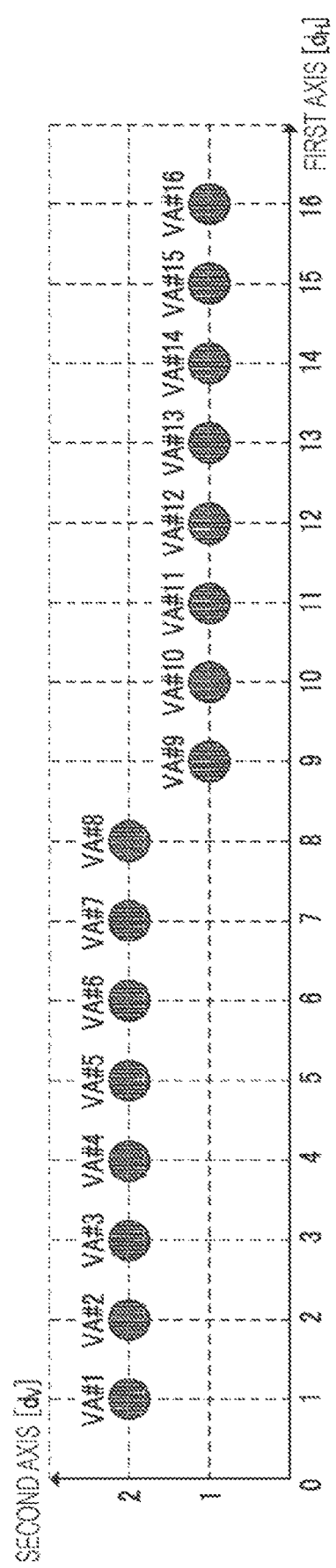
FIG. 13 is a diagram illustrating the layout of a virtual receiving array according to a second layout example.

FIG. 13 illustrates the layout of a virtual receiving array according to the second comparative example. For the sake of comparison, the number of elements in the receiving antenna according to the second comparative example is equal to the number of elements in the receiving antenna elements Rx #1 through Rx #8 illustrated in FIG. 10A, Further, the number of elements in the transmitting antenna according to the second comparative example is equal to the number of elements in the transmitting antenna elements Tx #1 and Tx #2 illustrated in FIG. 10B.

The eight elements of the receiving antenna are laid out equidistantly in the first axis direction as illustrated in FIG. 11A, to maximize the aperture length of the virtual receiving array in the first axis direction. Further, the two elements of the transmitting antenna are laid out at a spacing of $8 \times d_H$ in the first axis direction, as illustrated in FIG. 10B. In this case, the layout of the virtual receiving array is the layout illustrated in FIG. 13.

In a case where there are multiple targets at the same distance and the same speed in a situation where the virtual receiving array having the layout illustrated in FIG. 13 is being used, error will occur in estimation of the vertical direction component of the direction of arrival, for example. On the other hand, a pair of virtual receiving arrays are arrayed in the second axis direction in the virtual receiving array according to the first embodiment, so error in estimation of the vertical direction component is small even in a case where there are multiple targets at the same distance and the same speed, so detection precision is improved.

An arrangement where the spacing of the transmitting antenna elements Tx #1 and Tx #2 of the transmission array antenna 108 in the first axis direction is equal to the synthesized aperture length dR of the receiving array antenna 202 is preferable, since the aperture length of the virtual receiving array in the first axis direction can be maximized while arraying at least one pair of virtual receiving arrays in the second axis direction. For example, the synthesized aperture length dR of the receiving array antenna 202 illustrated in FIG. 10A, and the spacing of the transmitting antenna elements Tx #1 and Tx #2 of the transmission array antenna 108 illustrated in FIG. 10B are both equal at $8 \times d_H$. However, the spacing between the transmitting antenna elements Tx #1 and Tx #2 of the transmission array antenna 108 is not restricted to this arrangement, and an arrangement may be made where the spacing between the transmitting antenna elements Tx #1 and Tx #2 is the synthesized aperture length dR of the receiving array antenna 202 or less, and is an integer multiple of the first spacing $d_H$. Having the spacing between the transmitting antenna elements Tx #1 and Tx #2 in the first axis direction to be narrower increases combinations with virtual receiving arrays arrayed in the second axis direction, thereby improving precision in the vertical direction.

In the first layout example illustrated in FIG. 10A, the third spacing du between the receiving antenna elements Rx #7 and Rx #8 is equal to $2 \times d_H$. However, the size of the third spacing du is not restricted to this. For example, enlarging the third spacing du and enlarging the aperture length of the virtual receiving array enables the main lobe of the formed beam to be narrowed, thereby improving resolution. Also, for example, narrowing the third spacing du and narrowing the aperture length of the virtual receiving array enables the sidelobe level to be reduced.

Second Layout Example

In the first layout example illustrated in FIG. 10A, the end portion of the receiving array antenna 202 is laid out non-equidistantly, so that the spacing between the receiving antenna elements Rx #7 and Rx #8 is different from the spacings between the receiving antenna elements Rx #1 through Rx #7. However; the antenna layout according to the first embodiment is not restricted to the first layout example.

Figure 14A:
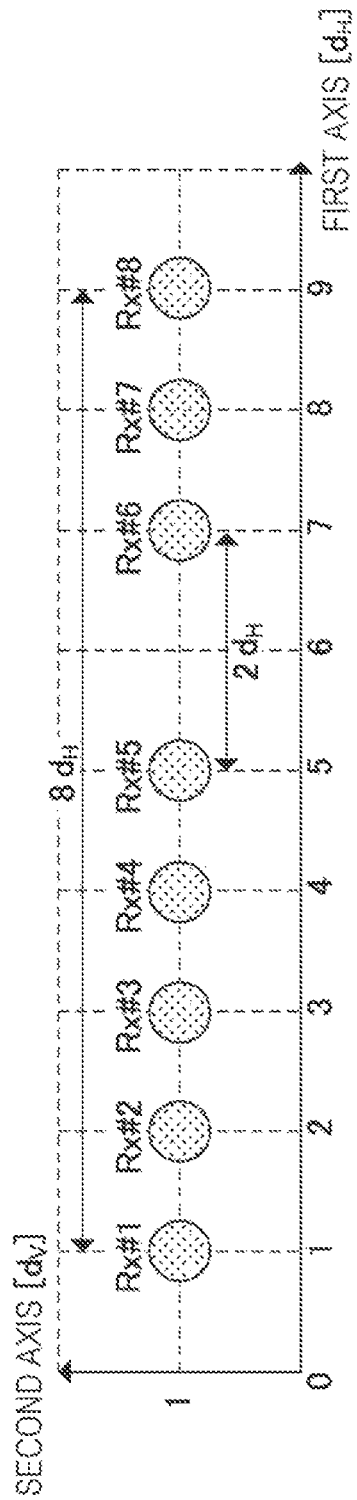
FIG. 14A is a diagram illustrating a second layout example of receiving antennas in a receiving array antenna according to the first embodiment.

FIG. 14A illustrates a second layout example of receiving antenna elements Rx #1 through Rx #8 of the receiving array antenna 202 according to a second layout example of the first embodiment. In the second layout example illustrated in FIG. 14A, the inner side of the receiving array antenna 202 is laid out non-equidistantly, such that the spacing between the receiving antenna elements Rx #5 and Rx #6 is different form the spacings between the receiving antenna elements Rx #1 through Rx #5 and receiving antenna elements Rx #6 through Rx #8.

Figure 14B:
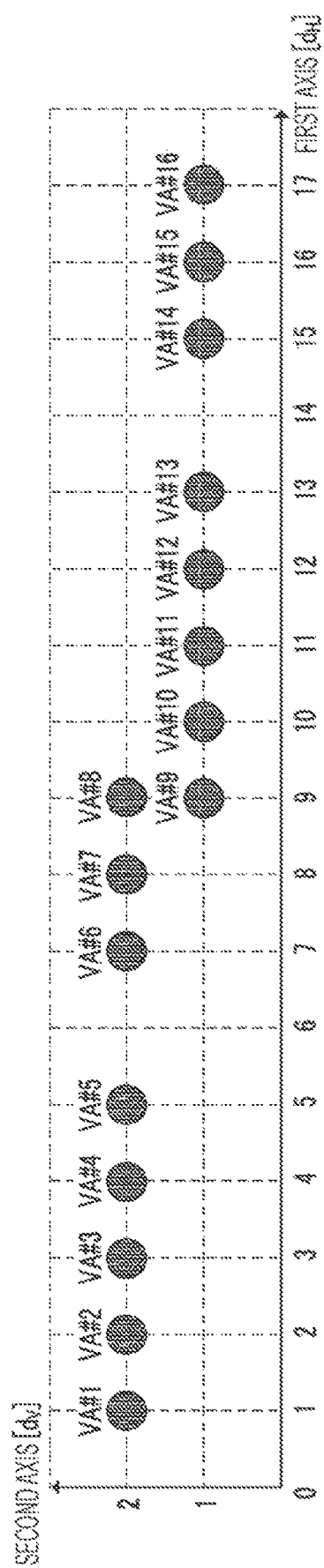
FIG. 14B is a diagram illustrating the layout of a virtual receiving array according to the second layout example.

FIG. 14B illustrates the layout of a virtual receiving array according to the second layout example. As illustrated in FIG. 14B, the pair of virtual antenna elements VA #8 and VA #9 are laid out adjacent at a spacing of $d_V$ in the second axis direction. It can also be seen from FIG. 14B that the aperture length of the virtual receiving array in the first axis direction is equal to $16 \times d_H$.

Figure 15:
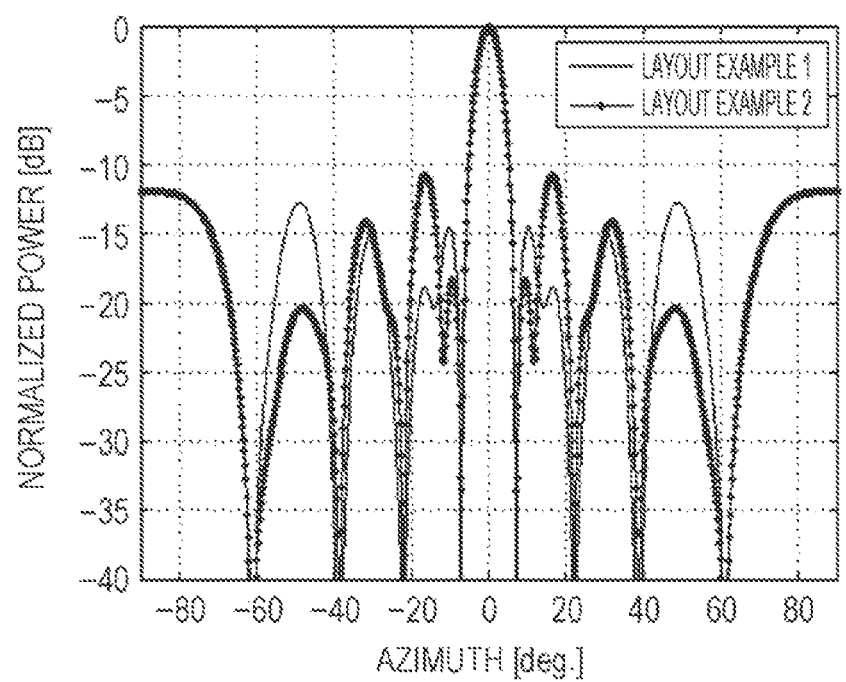
FIG. 15 is a cross sectional view of two-dimensional beams according to the first layout example and the second layout example at 0 degrees in the second axis direction, taken along the first axis direction.

FIG. 15 is a cross sectional view of two-dimensional beams according to the first layout example and the second layout example at 0 degrees in the second axis direction, taken along the first axis direction. It can be seen from FIG. 15 that changing the receiving antenna elements situated non-equidistantly in the receiving array antenna 202 changes the sidelobe level. On the other hand, the aperture length of the virtual receiving arrays are both equal to $16 \times d_H$ even if the receiving antenna elements situated non-equidistantly in the receiving array antenna 202 are changed, and there also is hardly any change in the main lobe width.

Note that the layouts of the transmission array antenna 108 and receiving array antenna 202 are not restricted to the above-described layouts. For example, even if the layouts of the transmission array antenna 108 and the receiving array antenna 202 are interchanged, a virtual receiving array that is the same as before interchanging is obtained, and properties the same as before interchange are obtained. Further, the layouts of the transmission array antenna 108 and receiving array antenna 202 may be horizontally inverted and/or vertically inverted.

In the first embodiment of the present disclosure, the radar device 10 has the radar transmitting unit 100 that transmits radar signals from the transmission array antenna 108, and the radar receiving unit 200 that receives returning wave signals of radar signals reflected at a target from the receiving array antenna 202. Further, the layouts illustrated in FIG. 9, 10A, 10B, or 14A are employed for the transmitting antenna elements Tx #1 through Tx #Nt of the transmission array antenna 108 and the receiving antenna elements Rx #1 through Rx #Na of the receiving array antenna 202.

According to the first embodiment of the present disclosure, a virtual receiving array that suppresses deterioration of resolution in the horizontal direction and has angular estimation capabilities in the vertical direction can be configured, and a radar device capable of three-dimensional measurement can be configured, that is highly precise in the horizontal direction and that performs angular estimation in the vertical direction. Further, according to the first embodiment of the present disclosure, a MIMO radar device capable of three-dimensional measurement, with additional angular estimation capabilities in the second axis direction, can be configured without deterioration of angular separation capabilities in the horizontal direction as compared with a MIMO radar device performing one-dimensional beam scanning.

Second Embodiment

A second embodiment, where the layout of transmitting antenna elements Tx #1 through Tx #Nt of the transmission array antenna 108 differs from the antenna layout in the first embodiment, will be described below. Note that the configuration of the radar device 10 according to the second embodiment is generally the same as the configuration of the radar device 10 according to the first embodiment illustrated in FIG. 1 except for the layout of the transmitting antenna elements Tx #1 through Tx #Nt of the transmission array antenna 108, so description of the configuration of the radar device 10 will be omitted.

Antenna Layout in Radar Device 10

Third Layout Example

Figure 16A:
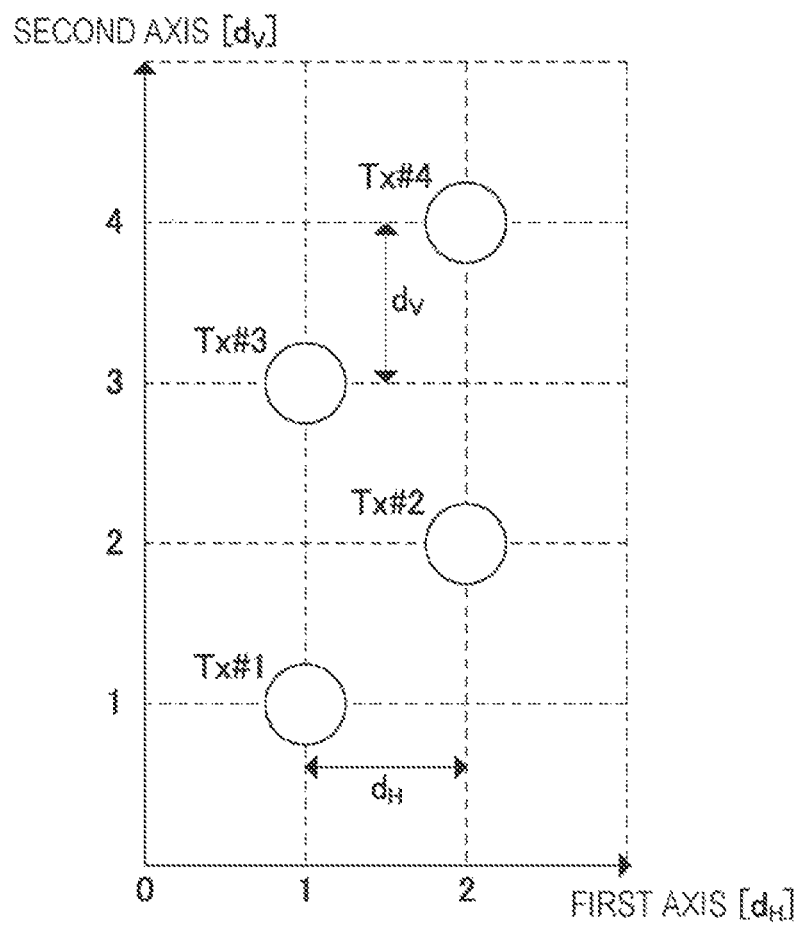
FIG. 16A is a diagram illustrating a third layout example of transmitting antennas in a transmitting array antenna according to a second embodiment.

FIG. 16A illustrates a third layout example of the transmitting antenna elements Tx #1 through Tx #Nt of the transmission array antenna 108 according to the second embodiment. In FIG. 16A, the sum Nt of the transmitting antenna elements #1 through #Nt is equal to four. The transmitting antenna elements #1 through #4 are laid out at the second spacing $d_V$ in the second axis direction, and also shifted by the first spacing $d_H$ in the first axis direction every other one. The first spacing $d_H$ and the second spacing $d_V$ respectively are, for example, equal to 0.5 wavelengths and 0.6 wavelengths.

Each of the antenna elements of the transmission array antenna 108 have the phase center at points (blank circles) illustrated in FIG. 16A, and are configured with the aperture length widened to a level where antennas do not interfere with each other in the second axis direction, and the beam width is narrowed in the vertical direction. In a case of using the transmission array antenna 108 for a near-range wide-angle observation application, the field of view (FoV) may be set wide in the horizontal direction and the vertical direction. For example, the FoV is around 80 degrees in the horizontal direction and around 30 degrees in the vertical direction.

The layout of the multiple receiving antenna elements #1 through #Na of the receiving array antenna 202 according to the third layout example of the second embodiment is the same layout as the layout illustrated in FIG. 10A. Antenna elements with the aperture length widened in the second axis direction so that the beam width in the vertical direction is around 30 degrees, which is the field of view, with the points illustrated in FIG. 10A as the phase centers, are used for each of the antenna elements in the receiving array antenna 202.

The multiple transmitting antenna elements #1 through #Nt and the multiple receiving antenna elements #1 through #Na may be antennas having a wide beam width so as to be able to observe a wide angle in the horizontal direction. The antenna elements may be configured using sub-array antennas, an array weight may be applied to the sub-array antenna to suppress sidelobes.

Dummy antenna elements may be disposed for the receiving antenna elements Rx #1 through Rx #8 laid out non-equidistantly as illustrated in FIG. 10A. For example, dummy antenna elements may be disposed in non-equidistant regions such as between the receiving antenna element Rx #7 and the receiving antenna element Rx #8, a region to the left side of the receiving antenna element Rx #1, or a region to the right side of the receiving antenna element Rx #8. Disposing dummy antenna elements yields the advantages of uniform effects of electric properties such as antenna radiation, impedance matching, and isolation.

FIG. 16B illustrates the layout of a virtual receiving array according to the third layout example. The fact that the layout of the receiving antenna elements Rx #1 through Rx #8 and transmitting antenna elements Tx #1 through Tx #4 according to the second embodiment is an antenna layout that has high resolution in the horizontal direction and the vertical direction will be demonstrated below with by way of a third comparative example where the receiving antenna elements are laid out equidistantly.

Third Comparative Example

For the sake of comparison, the number Na of elements in the receiving antenna elements Rx #1 through Rx #8 according to the third comparative example is equal to the number of elements in the receiving antenna elements Rx #1 through Rx #8 illustrated in FIG. 10A which is eight. Also, the number Nx of elements in the transmitting antenna elements Tx #1 through Tx #Nx according to the third comparative example is equal to the number of elements in the transmitting antenna elements Tx #1 through Tx #4 illustrated in FIG. 16A, which is four.

In the third comparative example, the receiving antenna elements Rx #1 through Rx #8 are laid out equidistantly as illustrated in FIG. 11A. The transmitting antenna elements Tx #1 through Tx #4 are laid out in the same way as illustrated in FIG. 16A.

Figure 17:
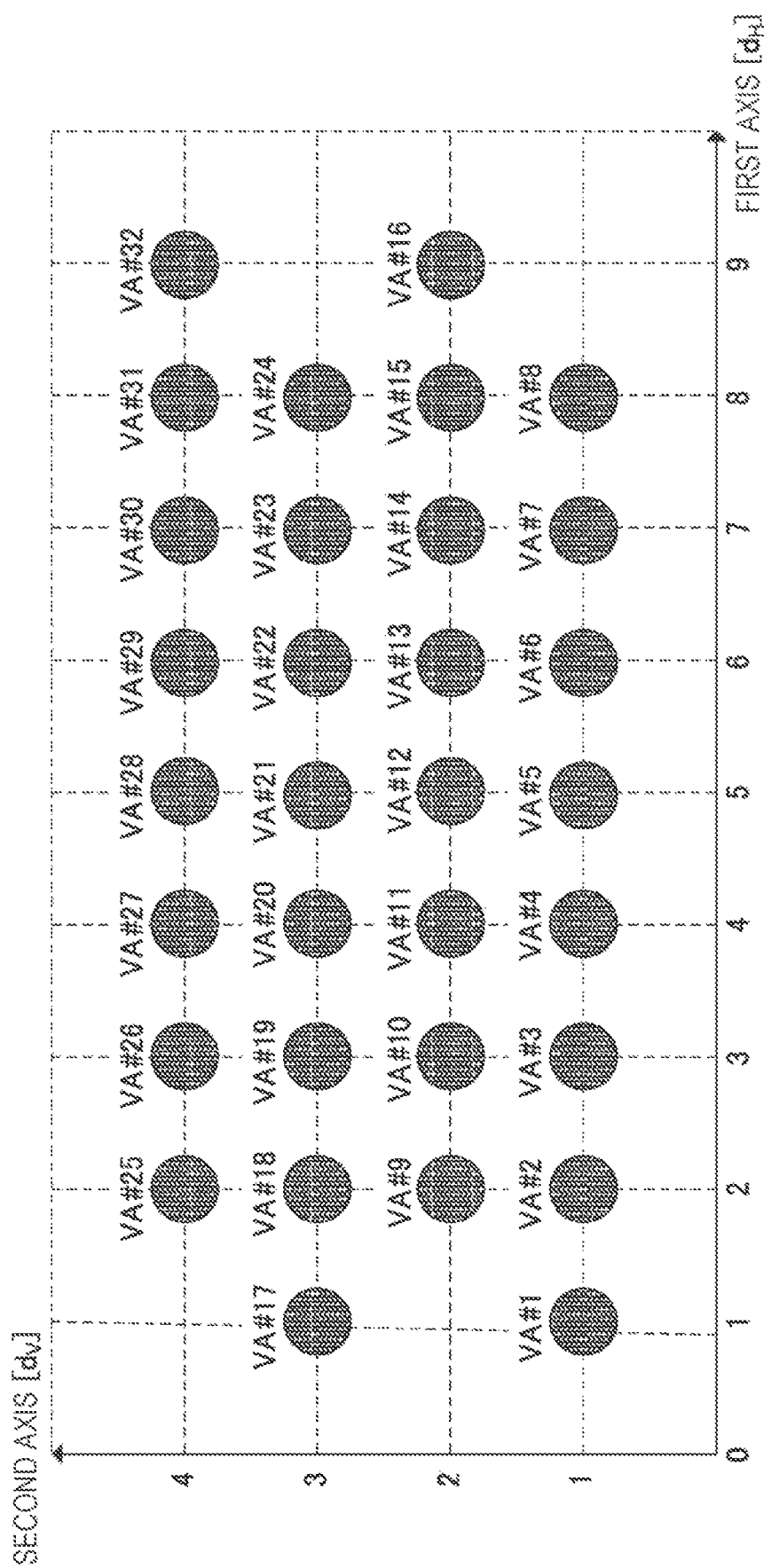
FIG. 17 is a diagram illustrating the layout of a virtual receiving array correlation vector according to a third comparative example.

FIG. 17 illustrates the layout of a virtual receiving array according to the third comparative example. The aperture length in the first axis direction of the virtual receiving array according to the third comparative example is $8 \times d_H$, as illustrated in FIG. 17. This aperture length is smaller than $9 \times d_H$, which is the aperture length in the first axis direction of the virtual receiving array according to the second embodiment illustrated in FIG. 16B.

Figure 18:
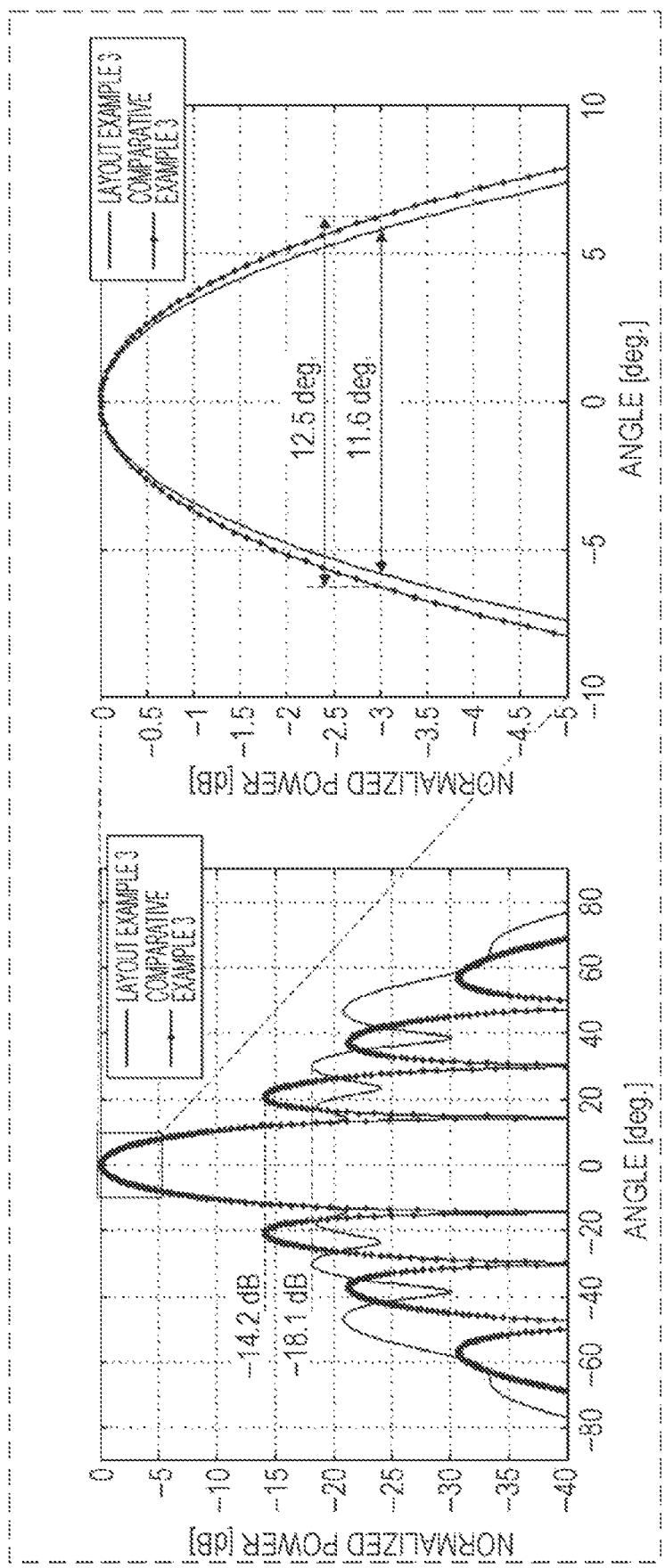
FIG. 18 is a cross sectional view of two-dimensional beams according to the third layout example and the third comparative example at 0 degrees in the second axis direction, taken along the first axis direction.

FIG. 18 is a cross sectional view of two-dimensional beams according to the third layout example and the third comparative example at 0 degrees in the second axis direction, taken along the first axis direction. The beam according to the second embodiment has lower adjacent sidelobes as compared to the beam according to the third comparative example, as illustrated in FIG. 18. That is to say, the antenna layout according to the second embodiment reduces the probability of erroneous detection as compared to the antenna layout according to the third comparative example. Also, the beam width according to the second embodiment is smaller than the beam width according to the third comparative example. That is to say, the antenna layout according to the second embodiment yields higher resolution as compared to the antenna layout according to the third comparative example.

In the second embodiment, the third spacing du between the receiving antenna elements Rx #7 and Rx #8 is equal to $2 \times d_H$ in the layout illustrated in FIG. 10a, in the same way as in the first embodiment. However, the size of the third spacing du is not restricted to this. For example, enlarging the third spacing du and enlarging the aperture length of the virtual receiving array enables the main lobe of the formed beam to be narrowed, thereby improving resolution. Also, for example, narrowing the third spacing du and narrowing the aperture length of the virtual receiving array enables the sidelobe level to be reduced.

In the second embodiment, changing the receiving antennas situated non-equidistantly in the receiving array antenna 202 changes the sidelobe level, in the same way as in the first embodiment. On the other hand, the aperture length of the virtual receiving array is unchanged even if the receiving antenna elements situated non-equidistantly in the receiving array antenna 202 are changed, and there also is hardly any change in the main lobe width.

Fourth Layout Example

Figure 19:
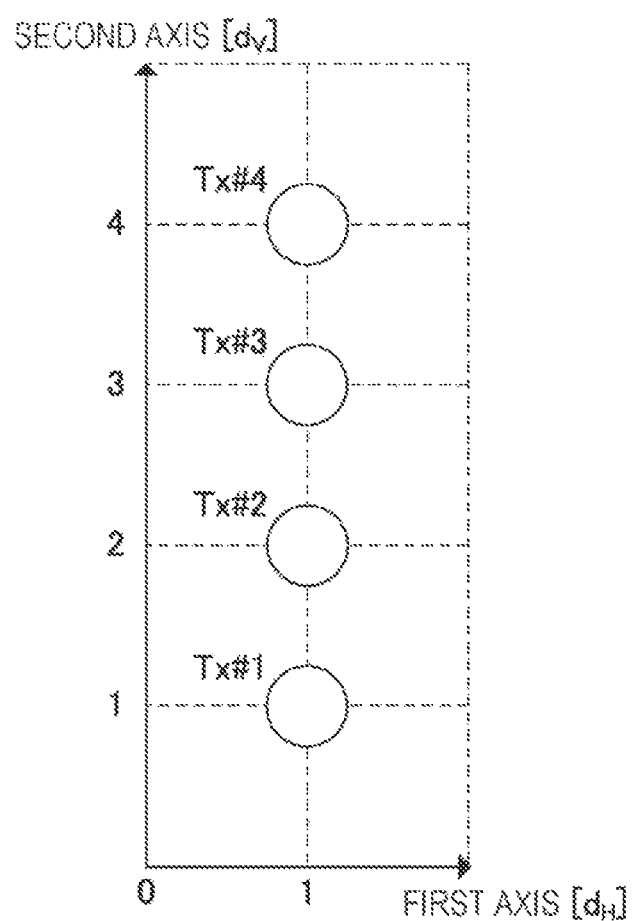
FIG. 19 is a diagram illustrating a fourth layout example of transmitting antennas in a transmitting array antenna according to the second embodiment.

FIG. 19 is a diagram illustrating a fourth layout example of the transmitting antenna elements Tx #1 through Tx #4 of the transmission array antenna 108 according to the second embodiment. In the second embodiment, even in a case where the transmitting antenna elements Tx #2 and Tx #4 are not shifted in the first axis direction by equidistantly laid out at the second spacing $d_V$ in the second axis direction, as in the fourth layout example illustrated in FIG. 19, the same advantages as those of the third layout example illustrated in FIG. 16A can be obtained.

The layouts of the transmission array antenna 108 and receiving array antenna 202 in the second embodiment are not restricted to the above-described layouts, in the same way as in the first embodiment. For example, even if the layouts of the transmission array antenna 108 and the receiving array antenna 202 are interchanged, a virtual receiving array that is the same as before interchanging is obtained, and properties the same as before interchange are obtained. Further, the layouts of the transmission array antenna 108 and receiving array antenna 202 may be horizontally inverted and/or vertically inverted.

In the second embodiment of the present disclosure, the radar device 10 has the radar transmitting unit 100 that transmits radar signals from the transmission array antenna 108, and the radar receiving unit 200 that receives returning wave signals of radar signals reflected at a target from the receiving array antenna 202. Further, the layouts illustrated in FIG. 16 or 19, for example, are employed for the transmitting antenna elements Tx #1 through Tx #Nt of the transmission array antenna 108 and the receiving antenna elements Rx #1 through Rx #Na of the receiving array antenna 202.

According to the second embodiment of the present disclosure, a MIMO radar device capable of three-dimensional measurement, which is capable of suppressing horizontal direction sidelobes of beams formed by the virtual receiving array, and further capable of improving resolution in the horizontal direction, with reduced probability of erroneous detection, can be configured.

Third Embodiment

Figure 20:
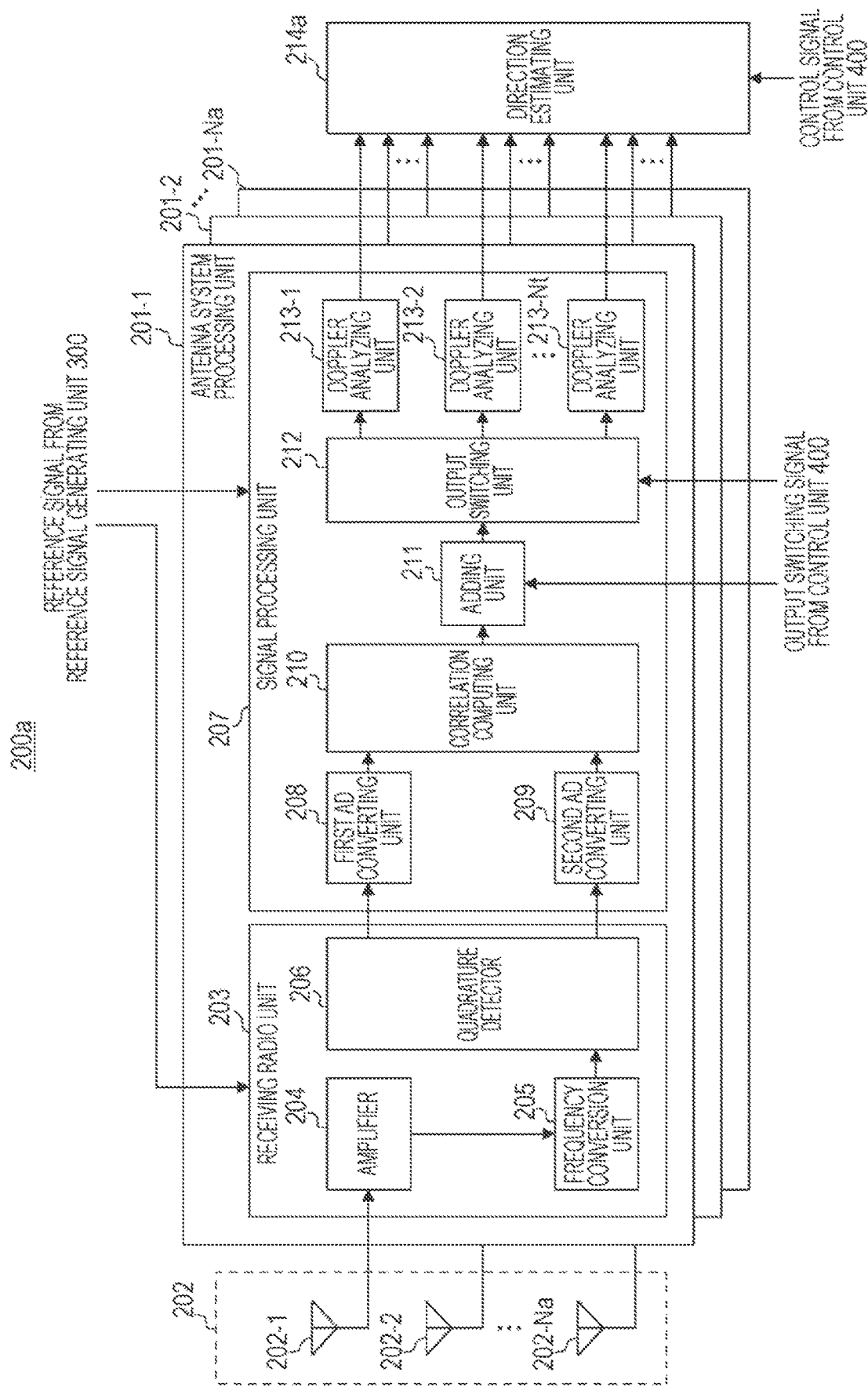
FIG. 20 is a block diagram illustrating an example of the configuration of a radar receiving unit according to a third embodiment.

A third embodiment, where the layout of transmitting antenna elements Tx #1 through Tx #Nt of the transmission array antenna 108 is switched in usage, will be described below. FIG. 20 is a block diagram illustrating an example of the configuration of a radar receiving unit (radar receiving circuit) 200a according to the third embodiment.

A direction estimating unit (direction estimating circuit) 214a of the radar receiving unit 200a has functions of the direction estimating unit 214 according to the first and second embodiments. Further, the direction estimating unit 214a inputs control signals from the control unit 400, and switches operation modes of the radar device 10 based on the control signals. Operation modes will be described layer with reference to FIG. 23. The components of the radar receiving unit 200a other than the direction estimating unit 214a are the same as the components of the radar receiving unit 200 according to the first and second embodiments, so description will be omitted.

Antenna Layout in Radar Device 10

Hereinafter, the third embodiment will be described by way of an example where the count alt of elements of the transmitting antenna elements Tx #1 through #Nt of the transmission array antenna 108 is equal to six, and the count Na of elements of the receiving antenna elements Rx #1 through #Na of the receiving array antenna 202 is equal to eight. However, the counts of elements are not restricted to these numbers.

In the third embodiment, the receiving antenna elements Rx #1 through #8 are partly laid out non-equidistantly, with a equidistant layout as the basis, in the same way as in the first and second embodiments. For example, the layout of the receiving array antenna 202 is the same as the layout illustrated in FIG. 10A.

Figure 21:
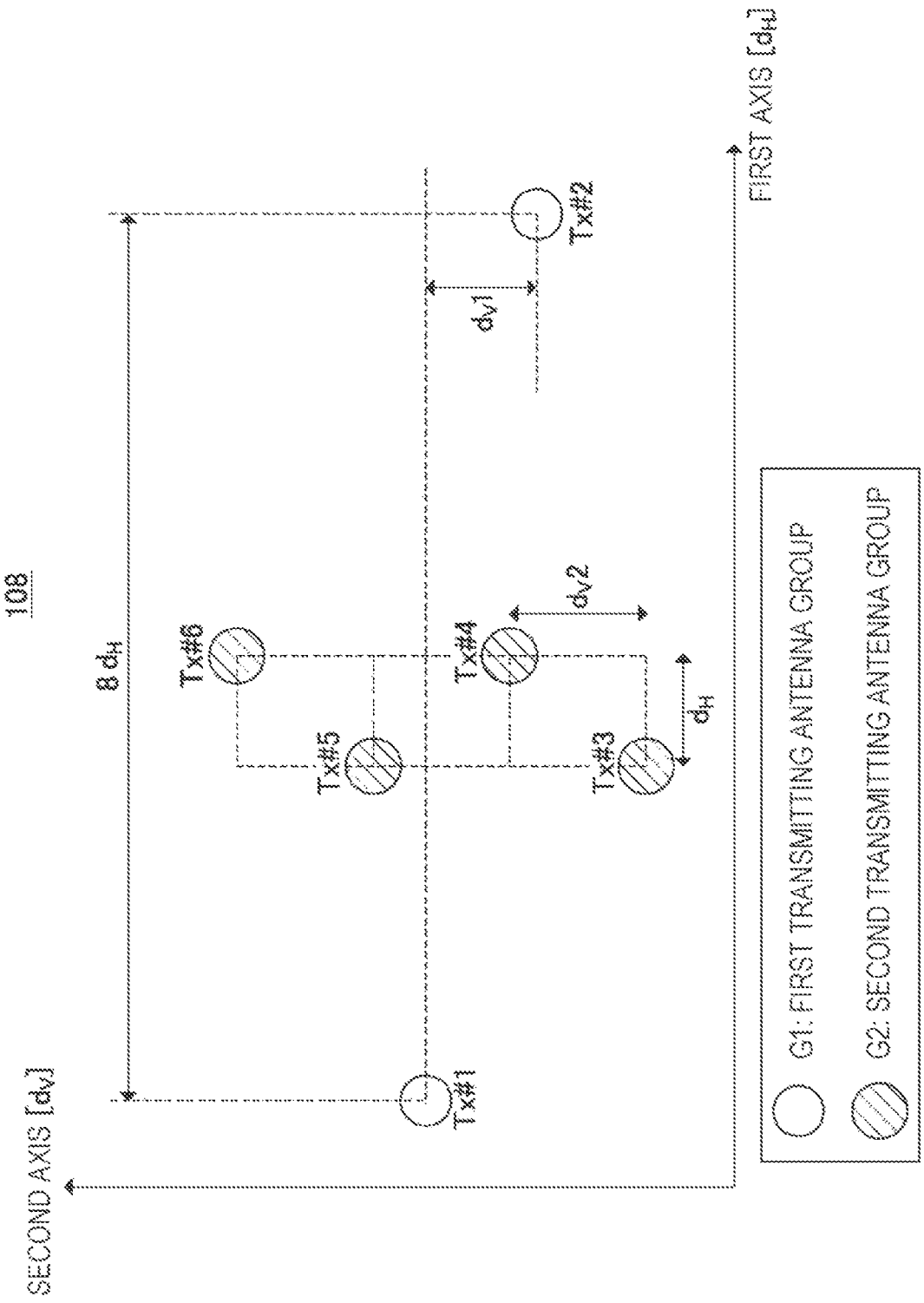
FIG. 21 is a diagram illustrating the fourth layout example of transmitting antennas in a transmitting array antenna according to the third embodiment.

FIG. 21 illustrates the fourth layout example of transmitting antenna elements Tx #1 through Tx #6 of the transmission array antenna 108 according to the third embodiment. The transmitting antenna elements Tx #1 through Tx #6 include a first transmitting antenna group G1 and a second transmitting antenna group G2.

The first transmitting antenna group G1 includes transmitting antenna elements Tx #1 and Tx #2, and the antenna layout thereof is the same as the layout of transmitting antenna elements Tx #1 and Tx #2 according to the first layout example of the first embodiment illustrated in FIG. 10B. The first transmitting antenna group G1 is used for long-range narrow-angle observation usages, for example.

The second transmitting antenna group G2 includes the transmitting antenna elements Tx #3 through Tx #6, and the antenna layout thereof is the same as the layout of the transmitting antenna elements Tx #1 through Tx #Nt according to the third layout example of the second embodiment illustrated in FIG. 16A. The second transmitting antenna group G2 is used for short-range wide-angle observation usages, for example. The transmitting antenna group being used is switched between the first transmitting antenna group G1 and second transmitting antenna group G2 in accordance with the observation usage.

The first transmitting antenna group G1 and second transmitting antenna group G2 each independently configure a virtual receiving array. The virtual receiving array correlation vector illustrated in FIG. 10C is configured by the first transmitting antenna group G1 and the receiving array antenna 202 illustrated in FIG. 10A. The virtual receiving array illustrated in FIG. 16B is configured by the second transmitting antenna group G2 and the receiving array antenna 202 illustrated in FIG. 10A.

The first transmitting antenna group G1 and second transmitting antenna group G2 illustrated in FIG. 21 may have the basic interval in the first axis direction in common, and may have a different spacing for the basic interval in the second axis direction. For example, a basic spacing $d_H1$ in the first axis direction for the first transmitting antenna group G1, and a basic spacing $d_H2$ in the first axis direction for the second transmitting antenna group G2, may both be 0.5 wavelengths. Also for example, the basic spacing $d_V1$ in the second axis direction for the first transmitting antenna group G1 may be equal to 0.5 wavelengths, and the basic spacing $d_V2$ in the second axis direction for the second transmitting antenna group G2 may be equal to 0.6 wavelengths.

As described above, the first transmitting antenna group G1 and second transmitting antenna group G2 each independently configure a virtual receiving array. Accordingly, the antenna elements of the first transmitting antenna group G1 and second transmitting antenna group G2 may be freely laid out, including size, unless physically interfering.

Figure 22:
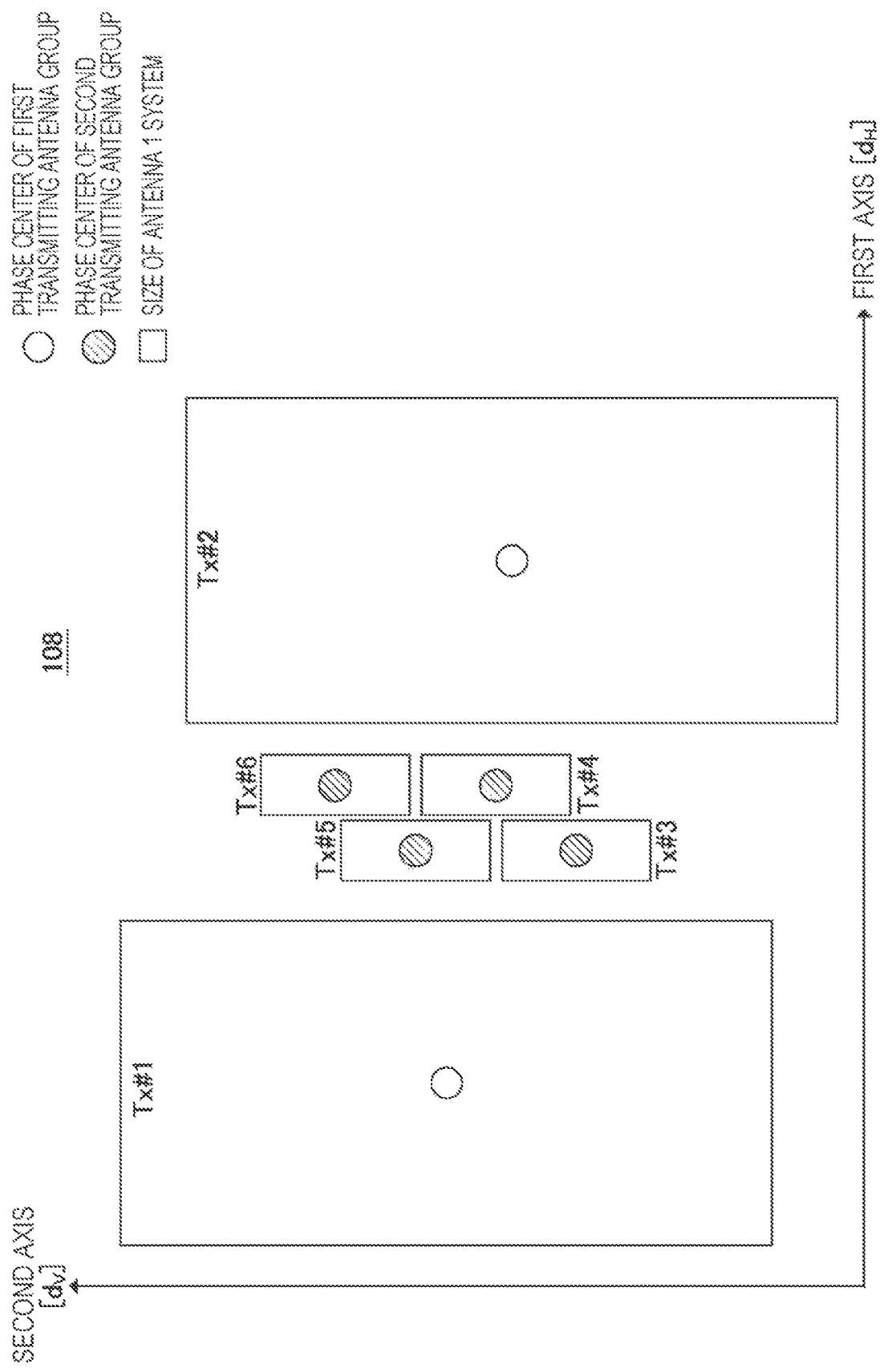
FIG. 22 is a diagram illustrating an example of the layout of antenna elements in a transmitting array antenna according to the fourth layout example.

FIG. 22 illustrates an example of the layout of the antenna elements of the transmission array antenna 108 according to the fourth layout example of the third embodiment. The overall installation area of the transmission array antenna 108 can be reduced by laying out the transmitting antenna elements of the second transmitting antenna group G2 between the transmitting antenna elements Tx #1 and Tx #2 of the first transmitting antenna group G1, as illustrated in FIG. 22.

The configurations of the antenna elements of the first transmitting antenna group G1 and second transmitting antenna group G2 may be configurations each suited for the field of view (FoV). For example, the aperture length of the antenna elements of the first transmitting antenna group G1 is widened in both directions of the first axis direction and second axis direction as illustrated in FIG. 22, to narrow the beam width in both the horizontal direction and vertical direction. Also, for example, the aperture length of the antenna elements of the second transmitting antenna group G2 is widened to a degree where there is no interference among the antenna elements as illustrated in FIG. 22, to obtain a radiation pattern of a beam that is relatively wide angle along the vertical direction. The antenna elements may be configured using sub-array antennas, an array weight may be applied to the sub-array antenna to suppress sidelobes.

Dummy antenna elements may be disposed for the receiving antenna elements Rx #1 through Rx #8 laid out non-equidistantly as illustrated in FIG. 10A in the third embodiment, in the same way as in the first embodiment. For example, dummy antenna elements may be disposed in non-equidistant regions such as between the receiving antenna element Rx #7 and the receiving antenna element Rx #8, a region to the left side of the receiving antenna element Rx #1, or a region to the right side of the receiving antenna element Rx #8. Disposing dummy antenna elements yields the advantages of uniform effects of electric properties such as antenna radiation, impedance matching, and isolation, for example.

Figure 23:
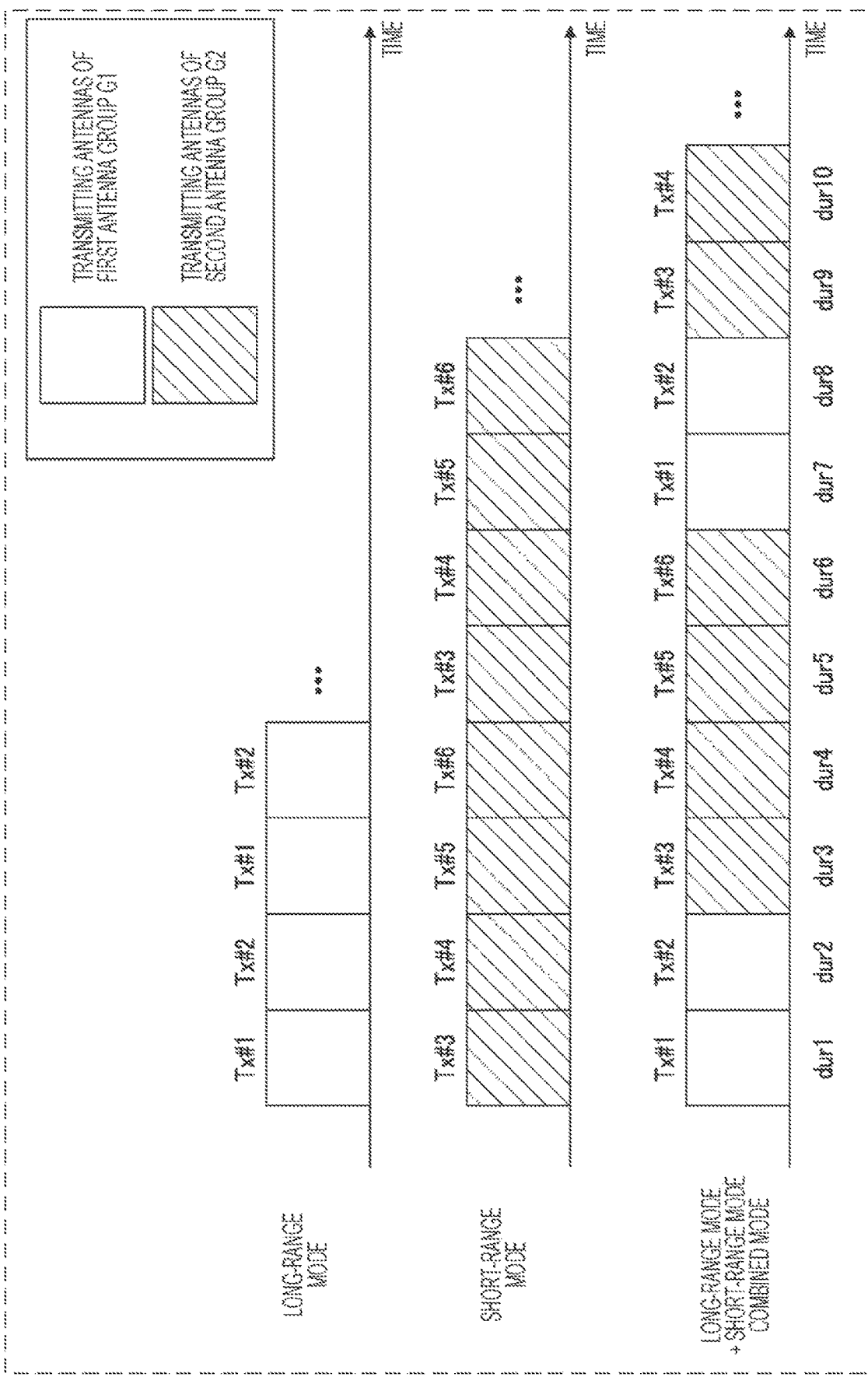
FIG. 23 is a diagram illustrating an example of time division switching control of a first antenna group and a second antenna group according to the third embodiment.

FIG. 23 illustrates an example of time division switching control of the first transmitting antenna group G1 and second transmitting antenna group G2 according to the third embodiment. In a case where the radar device 10 is a time division multiplexing MIMO radar, the radar transmitting unit 100 temporally switches antenna combinations to be used for time division multiplexed transmission, based on control signals from the control unit 400. In a long-range mode that is an operation mode for long-range narrow-angle observation, the radar transmitting unit 100 uses the transmitting antenna elements Tx #1 and Tx #2 of the first transmitting antenna group G1 for time division multiplexed transmission, as illustrated in FIG. 23. Also, in a short-range mode that is an operation mode for close-range wide-angle observation, the radar transmitting unit 100 uses the transmitting antenna elements Tx #3 through Tx #6 of the second transmitting antenna group G2 for time division multiplexed transmission.

Also, in a case of an operation mode where the long-range mode and short-range mode are combined, the radar transmitting unit 100 temporally switches the first transmitting antenna group G1 and second transmitting antenna group G2 to be used for time division multiplexed transmission. For example, the radar transmitting unit 100 switches all transmitting antenna elements Tx #1 through Tx #6 by time division. For example, in time slots dur1, dur2, dur7, and dur8, the transmitting antenna elements Tx #1 and Tx #2 of the first transmitting antenna group G1 are used for time division multiplexed transmission, as illustrated in FIG. 23. Also, in time slots dur8 through dur6, dur9, and dur10, the transmitting antenna elements Tx #3 through Tx #6 of the second transmitting antenna group G2 are used for time division multiplexed transmission. Note that the order of using the transmitting antenna elements Tx #1 through Tx #6 is not restricted to the order illustrated in FIG. 23.

Note that in the third embodiment, the radar receiving unit in FIG. 20 may be used, and the direction estimating unit 214 a may switch the operation mode of the radar device 10 based on control signals indicating the operation mode input from the control unit 400. Also, in the third embodiment, the radar transmitting unit illustrated in FIG. 2 may be used, and the radar transmission signal generating unit 101 may switch the operation mode of the radar device 10 based on control signals input from the control unit 400.

In one example, the radar transmitting unit 100 may transmit radar signals that have different signal properties regarding transmission cycle or transmission bandwidth in accordance with the operation mode, based on instruction information from the control unit 400. For example, in a case of operating in the close-range mode, the radar device 10 may transmit radar signals over a relatively board band, in order to obtain higher distance resolution. On the other hand, in a case of operating in the long-range mode, radar signals may be transmitted at a relatively short cycle, in order to observe objects moving at higher speeds.

In a case where the radar device 10 is a MIMO radar that multiplexes by code division or frequency division, the radar transmitting unit 100 may switch power supply to the first transmitting antenna group G1 and second transmitting antenna group G2 in accordance with the operation mode. Switching power supply selects the transmitting antenna group to be used, and the operation mode is switched.

In the third embodiment of the present disclosure, the radar device 10 includes the radar transmitting unit 100 that transmits radar signals from the transmission array antenna 108, and the radar receiving unit 200 that receives returning wave signals of radar signals reflected at a target from the receiving array antenna 202. The radar device 10 further switches the virtual receiving array to be used between the virtual receiving arrays configured in the first embodiment and the second embodiment, for example, in accordance with the operation mode. According to the third embodiment of the present disclosure, a MIMO radar capable of three-dimensional measurement can be configured that obtains the advantages of the first embodiment and second embodiment in accordance with the operation modes corresponding thereto.

Although various embodiments have been described above with reference to the drawings, it is needless to say that the present disclosure is not restricted to these examples. It is clear that one skilled in the art will be able to reach various alterations and modifications within the scope of the Claims, and such should be understood to belong to the technical scope of the present disclosure as a matter of course. Various components in the above-described embodiments may be optionally combined without departing from the essence of the disclosure.

Although examples of configuring the present disclosure using hardware have been described in the above-described embodiments, the present disclosure may be realized by software in cooperation with hardware as well.

The functional blocks used in the description of the above-described embodiments typically are realized as large-scale integration (LSI) that is an integrated circuit. An integrated circuit may control the functional blocks used in the description of the above-described embodiments, and have input and output. These may be individually formed into one chip, or part or all may be included in one chip. Also, while description has been made regarding an LSI, there are different names such as integrated circuit (IC), system LSI, super LSI, and ultra LSI, depending on the degree of integration.

The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology, for example, is a possibility.

Summarization of Embodiments

The radar device according to the present disclosure includes a radar transmitting circuit that transmits radar signals from a transmission array antenna, and a radar receiving circuit that receives returning wave signals, where the radar signals have been reflected at a target, from a receiving array antenna. One of the transmitting array antenna and the receiving array antenna includes a plurality of first antennas of which phase centers are laid out along a first axis direction. The other of the transmitting array antenna and the receiving array antenna includes a plurality of second antennas of which phase centers are laid out at a second spacing along a second axis direction that is different from the first axis direction. The plurality of first antennas include a plurality of antennas of which the phase centers are laid out at a first spacing, and a plurality of antennas of which the phase centers are laid out at a third spacing that is different from the first spacing.

In the radar device according to the present disclosure, the spacing of phase centers of adjacent antennas of the plurality of first antennas is equal to the first spacing excluding at least one spacing, and at least one spacing is equal to the third spacing.

In the radar device according to the present disclosure, the third spacing is equal to an integer multiple of the first spacing.

In the radar device according to the present disclosure, the third spacing is equal to twice the first spacing.

In the radar device according to the present disclosure, the at least one spacing is one spacing.

In the radar device according to the present disclosure, the phase centers of the plurality of second antennas are laid out at spacings equal to a synthesized aperture length of phase center of the plurality of first antennas, along the first axis direction.

In the radar device according to the present disclosure, the count of the second antenna elements is equal to two.

In the radar device according to the present disclosure, the length in the first axis direction of a range where the phase centers of the plurality of second antennas are laid out is equal to or less than a synthesized aperture length of phase center of the plurality of first antennas, and the plurality of second antennas are laid out at a spacing that is an integer multiple of the second spacing in the second axis direction.

In the radar device according to the present disclosure, the phase centers of the plurality of second antennas are laid out at the second spacing in the second axis direction.

In the radar device according to the present disclosure, the plurality of first antennas have a first antenna group and a second antenna group configured of different virtual receiving arrays, and the radar transmitting circuit and the radar receiving circuit each perform transmission of the radar signals and reception of the returning wave signals by switching between the first antenna group and the second antenna group.

The present disclosure is suitable as a radar device that detects over a wide-angle range, and can be installed in vehicles, for example.

What is claimed is:

1. A radar device, comprising:
   a radar transmitting circuit that transmits radar signals from a transmitting array antenna; and
   a radar receiving circuit that receives returning wave signals, where the radar signals have been reflected at a target, from a receiving array antenna,
   wherein one of the transmitting array antenna or the receiving array antenna includes a plurality of first antennas of which phase centers are laid out along a first axis direction,
   wherein the other of the transmitting array antenna or the receiving array antenna includes a plurality of second antennas of which phase centers are laid out at a second spacing along a second axis direction that is different from the first axis direction,
   wherein the plurality of first antennas include a plurality of antennas of which phase centers are laid out at a first spacing, and a plurality of antennas of which phase centers are laid out at a third spacing that is different from the first spacing, and
   wherein two or more spacing of phase centers of adjacent antennas of the plurality of first antennas is equal to the first spacing, and at least one spacing of phase centers of adjacent antennas of the plurality of first antennas is equal to the third spacing.

2. The radar device according to claim 1,
   wherein the third spacing is equal to an integer multiple of the first spacing.

3. The radar device according to claim 2,
   wherein the third spacing is equal to twice the first spacing.

4. The radar device according to claim 1,
   wherein the phase centers of the plurality of second antennas are laid out at spacings equal to a synthesized aperture length of phase center of the plurality of first antennas, along the first axis direction.

5. The radar device according to claim 4,
   wherein a count of the plurality of second antennas is equal to two.

6. The radar device according to claim 1,
   wherein a length in the first axis direction of a range where the phase centers of the plurality of second antennas are laid out is equal to or less than a synthesized aperture length of phase center of the plurality of first antennas, and the plurality of second antennas are laid out at a spacing that is an integer multiple of the second spacing in the second axis direction.

7. The radar device according to claim 6,
   wherein the phase centers of the plurality of second antennas are laid out at the second spacing in the second axis direction.

8. The radar device according to claim 1,
   wherein the plurality of second antennas have a first antenna group and a second antenna group configured of different virtual receiving arrays,
   and wherein the radar transmitting circuit and the radar receiving circuit each perform transmission of the radar signals and reception of the returning wave signals by switching between the first antenna group and the second antenna group.

9. The radar device according to claim 1,
   wherein phase centers of at least three consecutive antennas of the plurality of first antennas are spaced from each other by the first spacing.

* * * * *